United States Patent

Uekumasu

[19]

[11] Patent Number: 6,038,215
[45] Date of Patent: Mar. 14, 2000

[54] NETWORK SYSTEM AND COMMUNICATION DEVICE

[75] Inventor: Akira Uekumasu, Osaka, Japan

[73] Assignee: Fujitsu Limited, Kanagawa, Japan

[21] Appl. No.: 09/039,001

[22] Filed: Mar. 13, 1998

[30] Foreign Application Priority Data

Oct. 17, 1997 [JP] Japan .................................. 9-285838

[51] Int. Cl.[7] .............................................. G08C 15/00
[52] U.S. Cl. ...................... 370/230; 370/235; 370/412; 370/445
[58] Field of Search .................................. 370/230, 232, 370/235, 236, 245, 401, 445, 446, 395, 428, 434, 407, 412, 389

[56] References Cited

U.S. PATENT DOCUMENTS

| | | | |
|---|---|---|---|
| 4,894,819 | 1/1990 | Kondo et al. . | |
| 5,436,617 | 7/1995 | Adams et al. | 370/254 |
| 5,455,820 | 10/1995 | Yamada | 370/395 |
| 5,493,566 | 2/1996 | Ljunberg et al. | 370/235 |
| 5,742,606 | 4/1998 | Iliadis et al. | 370/230 |
| 5,787,072 | 7/1998 | Shimojo et al. | 370/236 |
| 5,835,484 | 11/1998 | Yamato et al. | 370/236 |
| 5,838,677 | 11/1998 | Kozaki et al. | 370/235 |
| 5,898,669 | 4/1999 | Shimony et al. | 370/232 |

*Primary Examiner*—Chau Nguyen
*Assistant Examiner*—Phuongchau Ba Nguyen
*Attorney, Agent, or Firm*—Helgott & Karas, P.C.

[57] ABSTRACT

In the present invention, the first communication device accepting the first LAN and the second communication device accepting the second LAN are connected through the ATM network. When data is transmitted from the second LAN to the first LAN, data transmitted from the second LAN is received by the first communication device through the second communication device and the ATM network, and held by the buffer unit until transmitted to the first LAN by the transmission part. The monitor part the storage quantity of the buffer unit. When the monitor part indicates the possibility that data overflows from the buffer unit, the control data generation part generates control data and transmits it to the second communication device. In the second communication device, the control part obtains the control data and reduces data quantity transmitted from the second communication device to the first communication device based on the control data.

19 Claims, 21 Drawing Sheets

NETWORK SYSTEM AND COMMUNICATION DEVICE

BACKGROUND OF THE INVENTION

1. Field of the Invention

This invention relates to a communication device with a LAN (Local Area Network) interface and an ATM (Asynchronous Transfer Mode) interface and relates to a network system with this communication device.

2. Description of the Related Art

Conventionally, some access control methods are proposed to avoid a transmission information collision which occurs in a LAN. As one of typical access control methods, there is a CSMA/CD (Carrier Sense Multiple Access with Collision Detection). In the LAN adopting CSMA/CD, when a collision of transmission information is detected, the transmission information is re-transmitted after waiting a random amount of time.

A proposal is given of a device which has a interface to the LAN adopting this CSMA/CD (such as 10BASE-5, 10BASE-T, 100BASE-TX and Ethernet, hereinafter, called "Ethernet etc.") and an ATM interface, and which performs intercommunication between Ethernet etc. and an ATM network. Namely, a device connecting a LAN such as Ethernet and an ATM network (hereinafter, called "ATM device") is proposed.

FIG. 19 is an explanatory view showing an example of the above-described ATM device. In FIG. 19, an ATM device 1 is provided with a CSMA/CD interface part 2, an up cell buffer 3 connected to the CSMA/CD interface part 2, an ATM-SW part 4 connected to the up cell buffer 3, a down cell buffer 5 connected to the ATM-SW part 4, and a CSMA/CD interface 6 connected to down cell buffer 5. A LAN 7 is connected to the CSMA/CD interface 2 through an Ethernet interface (LAN interface), and a LAN 8 is connected to the CSMA/CD interface 6 through an Ethernet interface. With this arrangement, the so-called ATM-LAN network is structured. Incidentally, FIG. 19 shows the ATM device regarding the LAN 7 as the up side and the LAN 8 as the down side and transmitting data received from the LAN 7 to the LAN 8.

In the ATM-LAN network shown in FIG. 19, when a plurality of Ethernet frames (packet: hereinafter, called "frame") is transmitted from the LAN 7 to the ATM device 1, a frame reception part 2a in the CSMA/CD interface part 2 receives each frame. Each frame received by the frame reception part 2a is stored in a buffer 2b. The frame stored in the buffer 2b is read by a ATM cell transmission part 2c. The ATM cell transmission part 2c takes out data (user data) from the frame read from the buffer 2b, and stores the user data into an ATM cell (hereinafter, called "cell"). Then, the ATM cell transmission part 2c transmits cells to the ATM-SW part 4 in accordance with a predetermined cell transmission quantity. Each cell transmitted from the ATM cell transmission part 2c is stored in the up cell buffer 3.

The ATM-SW part 4 receives a cell from the up cell buffer 3 and executes switching for the cell. The is transmitted to the CSMA/CD interface part 6 hereby. The cell transmitted from the ATM-SW part 4 is stored in the down cell buffer 5. An ATM cell reception part 6a in the CSMA/CD interface part 6 reads a cell from the down cell buffer 5 in accordance with a predetermined reading quantity. Successively, the ATM cell reception part 6a takes out data from the received cell, and stores the data into the frame. Then, the ATM cell reception part 6a stores the frame keeping the data in the buffer 6b. The frame transmission part 6c reads a frame from the buffer 6b, and transmits the frame to the LAN 8. In this way, data communication is executed between the LAN 7 and the LAN 8.

Now, as shown in FIG. 19, for example, when the data transmission rate in the LAN 7 is 100 Mbps and the data transmission rate in the LAN 8 is 10 Mbps, the ATM device 1 can not transmit the data received from the LAN 7 to the LAN 8 at the data transmission rate in the LAN 7. Thus, the ATM device 1 transmits frames to the LAN 8 little by little. In this case, the ATM device 1 prevents the loss of data received from the LAN 7 by storing data (cell) received from the LAN 7 in the cell buffer 5. However, for example, when the ATM device 1 continuously receives a large quantity of data (frame) from the LAN 7, the cell buffer 5 gets impossible to keep cells and then the so-called buffer overflow (overflow) occurs in the cell buffer 5, whereby there is a case in that data is lost.

In view of this problem, in the ATM device 1, a not-shown control unit contained in the ATM-SW part 4 monitors the data storage quantity in the down cell buffer 5. When the data storage quantity in the down cell buffer 5 exceeds a predetermined threshold, the not-shown control unit transmits a band control signal to the ATM cell transmission part 2c (refer to FIG. 20). The ATM cell transmission part 2c, when receiving the band control signal, lowers the cell transmission quantity. As a result, the quantity of cells transmitted from the ATM-SW part 4 to the down cell buffer 5 lowers, therefore, the overflow in the down cell buffer 5 is prevented.

The above-described ATM device 1, however, has the following problem. For example, as shown in FIG. 21, it is assumed that there is a ATM-LAN network in which a LAN 8 or LAN 8a is connected to each of ATM devices 1a, 1b structured similarly to the ATM device 1 shown in FIG. 19, and these ATM devices 1a, 1b are connected to the ATM network 9. In this ATM-LAN network, each of the ATM devices 1a, 1b can control only the down cell buffer 5 in each of the ATM devices. That is, the ATM device 1a cannot control the down cell buffer 5 in the ATM device 1b, and the ATM device 1b cannot control the down cell buffer 5 in the ATM device 1a.

Accordingly, as shown in FIG. 21, when a large quantity of data is transmitted from the LAN 8a to the LAN 8, there is a possibility in that overflows of the downward buffer in the ATM device 1a occurs, however, the ATM device 1a cannot stop the cells transmitted the from ATM device 1b. Thus, there is a possibility in that overflow occurs in the downward buffer 5 of the ATM device 1b.

Further, in the ATM device 1 shown in FIG. 19, as shown in FIG. 22, the ATM transmission part 2c in the CSMA/CD interface part 2 receives a band control signal and lowers the transmission band of cells (transmission rate) according to the band control signal, thereby preventing overflow in the downward buffer 5. However, when the transmission rate in the ATM cell transmission part 2c is narrowed, the frame rate of the upward buffer 2b rises, and, at last, frames overflow from the upward buffer 2b.

When frames overflow from the upward buffer 2b, the frames are discarded. However, it is not immediately notified to the LAN 7 that frames are discarded. In this case, frames received from the LAN 7 are checked by the high layer in another LAN to be a communicated partner of the LAN 7. An error caused by not receiving discarded frames is detected, and the error is recognized to the LAN 7, whereby the LAN 7 know for the first time that frames are discarded.

Accordingly, to restore the data communication between the LAN 7 and the other into the normal condition, there is only a way in that the re-transmission procedure by the high layer is executed between the LAN 7 and the other LAN. However, it takes a lot of time till the re-transmission procedure of frame is finished after an error is detected on the basis of the frame discard in the other LAN. Thus, there is a possibility in that throughput of data communication deteriorates.

Further, when the storage quantity of buffer is controlled without considering property (such as half duplex line, CSMA/CD method) of the LAN (Ethernet) connected to the ATM device 1, the data transmission quantity between LANs is narrowed needlessly, whereby there is a possibility in that the throughput lowers.

SUMMARY OF THE INVENTION

The present invention is achieved in view of the above-described problems, and has as its object the provision of network system and communication device controlling buffers more appropriately than the conventional ATM device so as to prevent to lower the throughput, thereby smoothing the data communication between LANs.

The present invention introduces the following structure to solve the above-described problems. That is, the first aspect of the present invention is a network system comprises a first communication device connected to a first local area network and an Asynchronous Transfer Mode network, and a second communication device connected to a second local area network and the Asynchronous Transfer Mode network. The first communication device comprises a buffer unit for holding data received from the Asynchronous Transfer Mode network; a first transmission part for transmitting the data held by the buffer unit to the first local area network; a monitor part for monitoring a storage quantity of the data held by thee buffer unit; and a control data generation part for generating and transmitting control data when the monitor means indicates a possibility of a overflow of the data in the buffer unit. The second communication device comprises a second transmission part for transmitting data received from the second local area network to the first communication device; and a control part for obtaining the control data transmitted from the control data generation part and for reducing a quantity of the data transmitted from the transmission part based on the control data.

According to the first aspect, data is communicated between the first local area network (the first LAN) and the second local area network (the second LAN). Data received from the Asynchronous Transfer Mode (ATM) network is held by the buffer unit when data is transmitted from the second communication device to the first communication device. The data storage quantity of the buffer unit is monitored by the monitor part, and it is judged whether there is a possibility that data overflows from the buffer unit or not. Then, the control data generation part gives the control data to the second communication device when the possibility of the overflow is indicated by the monitor part. Then, the control part receives the control data and reduces the data quantity transmitted from the transmission part based on the control data. As a result, the data reception quantity of the first communication device reduces. Thus, the speed for storing data in the buffer unit lowers. Further, when the data reception quantity of the first communication device per unit time is lower than the data transmission quantity to the first LAN per unit time, the storage quantity of the buffer unit lowers. In this way, according to the first aspect of the present invention, it is possible to prevent the overflow in the buffer unit of the first communication device by controlling the second communication device corresponding to the other communication device. Thus, it is possible to avoid a re-transmission procedure between the first LAN and the second LAN caused by the overflow of data, therefore, it is possible to prevent deterioration of throughput caused by executing the re-transmission procedure.

For example, ATM devices such as an ATM-HUB, an ATM router, an ATM handler and an ATM switch are mentioned as the first communication device and the second communication device. Ethernet is mentioned as the first LAN and the second LAN.

In the first aspect, it is preferable that data transmitted from the first communication device to the second communication device and the control data are transmitted through a same connection. As a result, it is possible to omit time for establishing data connection (ATM connection), therefore, it is possible to control the second communication device more quickly.

In the first aspect, it is preferable that the control data generation part generates and transmits a control cell in which said control data is included. The control data may be transmitted by another transmission format except cells. When the control data is transmitted by using cells, it is preferable that the control data generation part generates a control cell by storing the control data and a payload identifier showing that the cell is the control cell in a payload of a cell generated in AAL Type 5 format.

Further, in the first aspect, the control data generation part may transmit the control data to the second communication device with a point-to-multipoint transmission. As a result, cells are multicast to a plurality of destinations, therefore, it is possible to transmit the control data more quickly than a case that control information is transmitted through each connection when there are two or more connections between the first communication device and the second communication device and when the first communication device communicates with a plurality of communication devices.

In the first aspect, the control part makes the transmission part stop data transmission to the first communication device based on the control data. As a result, the data reception quantity from the second communication device per unit time becomes zero, therefore, it is possible to prevent overflow in the buffer unit appropriately and it is possible to lower the storage quantity of the buffer unit.

In the first aspect, it is preferable that the second communication device further comprises a second buffer unit for holding data received from the second local area network and transmitted by the transmission part and a judgement means for judging whether the data overflows from the second buffer or not, and the control part stops data reception from the second local area network when the judgment part judges that the data overflow from the second buffer. As a result, the data transmission from the second communication device to the first communication device is stopped, whereby it is prevent the overflow in the second buffer unit of the second communication device In the first aspect, the control data generation part may generate control data and the control part obtains the control data and stops data transmission from the second local area network when the monitor part judges that data overflows from the buffer unit. As a result, since it is possible for the second LAN to recognize an overflow occurring in the first communication device, namely, a loss of data, it is possible to execute the re-transmission procedure between the first LAN and the second LAN more quickly, therefore, it becomes possible to prevent deterioration of the throughput.

In the first aspect, it is desirable that the second local area network is a LAN executing a carrier sense multiple access/collision detection control, namely, Ethernet, and the control part stops data reception from the second local area network by transmitting a jam signal (jabber signal) to the second local area network. In addition, the control part stops data reception from the second local area network by transmitting a carrier signal instead of the jam signal to the second local area network.

Further, in the first aspect, it is preferable that data is earlier discarded as the data is latter revived by the first communication device when data overflows from the buffer unit. As a result, it is possible to shorten the re-transmission procedure.

In the first aspect, the monitor part, when releasing the possibility of the overflow of the data, may generate and transmit control release data to the second communication device, and the control part may raise the quantity of the data transmitted from the transmission part based on the control release data.

In the first aspect, when the monitor part releases the possibility of the overflow of the data, the control data generation part may generate and transmit control release data to the second communication device, and the control part makes the transmission part start again data transmission of the first communication device based on the control release data.

In the first aspect, when the monitor part releases the possibility of the overflow of the data, the control data generation part may generate and transmit control release data to the second communication device, and the control part may start again data reception from the second local are network based on the control release data.

In the first aspect, the first communication device may further comprise a threshold setting part for setting a threshold used by the monitor part to judge whether there is a possibility of the overflow or not based on a number of data connections established between the first local area network and the second local area network, and the monitor part may judge that there is a possibility of the overflow of the data when data storage quantity of the buffer unit exceeds the threshold.

The second aspect of the present invention is a network system comprising a first communication part connected to a local area network and an Asynchronous Transfer Mode network, the first communication part for storing data from the Asynchronous Transfer Mode network and for transmitting control data to the Asynchronous Transfer Mode network when judging that stored data overflows; and a second communication part for detecting control data obtained from the Asynchronous Transfer Mode and for transmitting a dummy signal to a local area network connected to said second communication device based on the control data.

For example, a carrier signal and a frame (packet) in which no transmitted data or no user data is included are mentioned as the dummy signal.

The third aspect of the present invention is a network system comprising a communication device connected to other communication device via a first line and transmitting data received from the first line to a second line of which a transmission speed is slower than that of the first line; the communication device comprising a buffer unit for holding data received from the first line; a judgment part for judging whether the data held by the buffer unit overflows or not; and a control data generation part for giving control data making the other communication device reduce data transmission quantity to the first line when the judgement part judges that data overflows.

According to the network system and the communication device of the present invention, it is possible to avoid a overflow of the buffer in the communication device of the network system in which a plurality of LANs are connected with the ATM network. Overflow is avoided so as not to execute the re-transmission procedure of data as far as possible, therefore, it is possible to prevent deterioration of throughput in data communication.

BRIEF DESCRIPTION OF THE DRAWINGS

Other objects and advantages of the present invention will become apparent during the following discussion conjunction with the accompanying drawings, in which.

DETAILED DESCRIPTION OF THE PREFERRED EMBODIMENT

Explanations will be given of the preferred embodiment of the present invention with reference to drawings.

Figure 1:
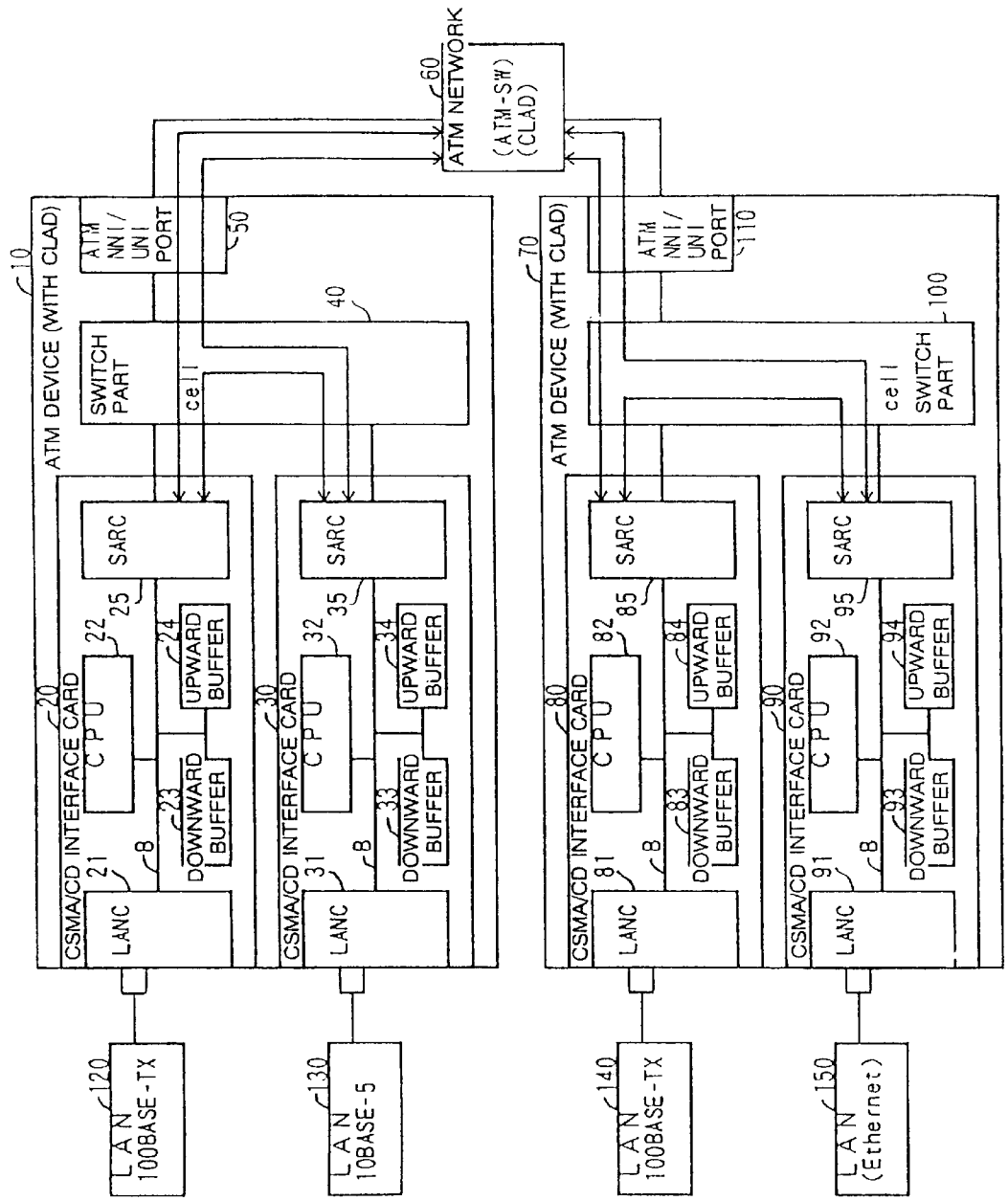
FIG. 1 is a whole structural view showing network system according to an embodiment of the present invention.

FIG. 1 is a whole structural view showing a network system of an embodiment according to the present invention.

The network system of the embodiment, as shown in FIG. 1, consists of ATM devices 10, 70, an ATM network 60 and LANs 120, 130, 140, 150.

Each of LANs 120, 130, 140, 150 is a LAN adopting the CSMA/CD method as an access control method, namely, Ethernet (such as 10BASE-5, 10BASE-T, 100BASE-TX) or the like, and is structured by connecting one or more of terminal, bridge, repeater, HUB, router and the like with communication cables. In addition, as long as each of LANs 120, 130, 140 and 150 is Ethernet or the like, any structure may be used.

The ATM network 60 consists of plural nodes connected with through communication cables (such as ATM-SW, ATM switching system, ATM router, ATM-HUB, ATM handler, and CLAD). The ATM network 60 may consist of single node.

A terminal in the LAN 120, 130, 140 or 150, when communicating data with a terminal in other LAN, transmits the frame containing data to the ATM device 10 or the ATM device 70. The ATM device 10 or 70 receiving the frame converts the frame into cells, and transmit the cells to the ATM network 60. The ATM device 10 or 70 receiving the cells from the ATM network 60 converts the cells into a frame, and transmits the frame to a LAN to be a destination.

Each of the ATM devices 10, 70 is provided with two CSMA/CD interface cards having the same structure, and respectively connected to the LANs, a switch unit, and a ATM NNI/UNI port. For example, the ATM device 10 is provided with a CSMA/CD interface card 20 connected to the LAN 120, a CSMA/CD interface card 30 connected to the LAN 130, a switch unit 40 connected to each of the CSMA/CD interface cards 20, 30 through a not-shown switch-card interface, and a ATM NNI/UNI port 50 connected to the switch unit 40.

The switch unit 40 consists of an ATM switch (ATM-SW), a CC (Channel Controller) controlling the ATM-SW or the like. The switch unit 40, when data is communicated between the LAN 120 and the other LAN, establishes a VCC (Virtual Channel Connection) to be a connection of data (cell). The switch unit 40, when receiving a cell, transmits the cell to one of the card 20, the card 30 and the ATM NNI/UNI port 50 based on VPI (Virtual Pass Identifier)/VCI (Virtual Channel Identifier) showing cell path information inclued in the cell header thereof.

The ATM NNI/UNI port 50 (hereinafter, called "port") transmits the cell received from the switch unit 40 to the ATM network 60 according to the predetermined digital hierarchy, and transmits the cell received from the ATM network 60 to the switch unit 40.

The CSMA/CD interface card 20 (hereinafter, called "card") is provided with a LAN controller (LANC) 21, a CPU (Central Processing Unit) 22, a downward buffer (memory) 23, an upward buffer (memory) 24 and a SARC (Segmentation And Reassembly Controller) 25 connected to through a bus B one another. Note that the card 20 is an IC card having a card-shaped body (case) attachable to and detachable from the body of the ATM device 10, and attachment of the card 20 to the ATM device 10 causes the SARC 25 in the card 20 to connect the switch port 40 through the switch-card interface.

The LANC 21 connected to the LAN 120 is a LSI which terminates the LAN 120, and transmits/receives frames to/from the LAN 120. The LANC 21 has ability to transmit a jam signal or carrier signal to the LAN 120 in accordance with an instruction from the CPU 22.

The downward buffer 23 stores frames transmitted downstream (in the direction from the switch unit 40 to the LAN 120) in the card 20. The upward buffer 24 stores frames transmitted upstream (in the direction from the LAN 120 to the switch unit 40) in the card 20. The downward buffer 23 and the upward buffer 24 consist of SRAMs (Static Random Access Memory) or flash memories.

The SARC 25 is a LSI which reads a frame from the upward buffer 24, converts the frame into a cell of AAL (ATM Adaptation Layer) Type 5 following LANE Ver 1.0/RFC 1483 format, and transmits the cell to the switch unit 40. The SARC 25 also converts the cell of AAL Type 5 format received from the switch unit 40 into a frame, and transmits the frame to the buffer 23. That is, the SARC 25 has ability to operate as the CLAD (Cell Assembly and Disassembly).

Furthermore, the SARC 25 has ability to generate buffer control cell corresponding to an instruction from the CPU 22, and transmits the buffer control cell to the switch unit 40. The SARC 25 also has ability to adjust the transmission band (a transmission rate of cells to the switch unit 40) in accordance with an instruction from the CPU 22.

The CPU 22 performs overflow control by executing program recorded in a memory not shown. The overflow control is roughly divided into a buffer control cell transmission process and a buffer control cell reception process. In the buffer control cell transmission process, buffer control cells are transmitted to the ATM network. And, the buffer control cell reception process is started when the buffer control cell is received from the ATM network by the SARC 25. Therefore, as a premise to explain the buffer control cell transmission process and the buffer control cell reception process, an explanation will be given of the buffer control cell.

<Buffer Control Cell>

Figure 2:
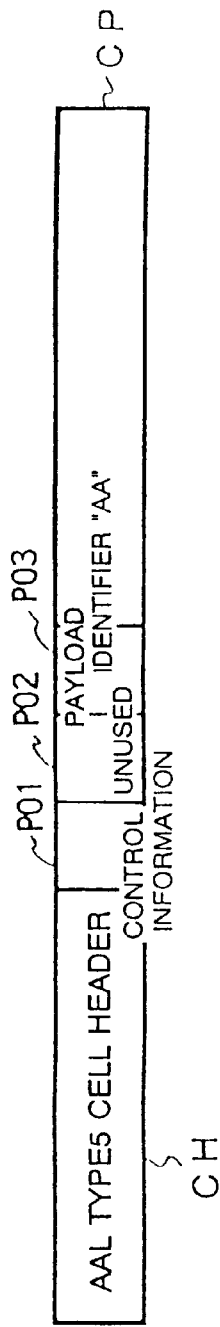
FIG. 2 is an explanatory view showing a format of a cell.

FIG. 2 is an explanatory view showing a cell of AAL Type 5 format according to the LANE Ver1 .0/RFC 1483. As shown in FIG. 2, the cell consists of a cell header CH in which transmitting information and destination information thereof and the like are included, and a payload CP in which user information and the like are included.

In the third octet PO 3 of the payload CP in a cell, a payload identifier showing the classification of the cell is included. According to the LANE Ver 1.0 Recommendation, when the cell is used to transmit frame data from the LAN, "00", "01" or "FF" is set to the third octet PO3. According to the RFC 1483 Recommendation, "03" is set to the third octet PO3.

When the cell is used as a buffer control cell, in the third octet PO3, "AA" is set. As a result, the CPU 22 can distinguish whether the cell is a cell (regular cell) for transmitting frame data or a buffer control cell by checking the third octet PO3 of the cell received by the SARC 25.

Figure 3:
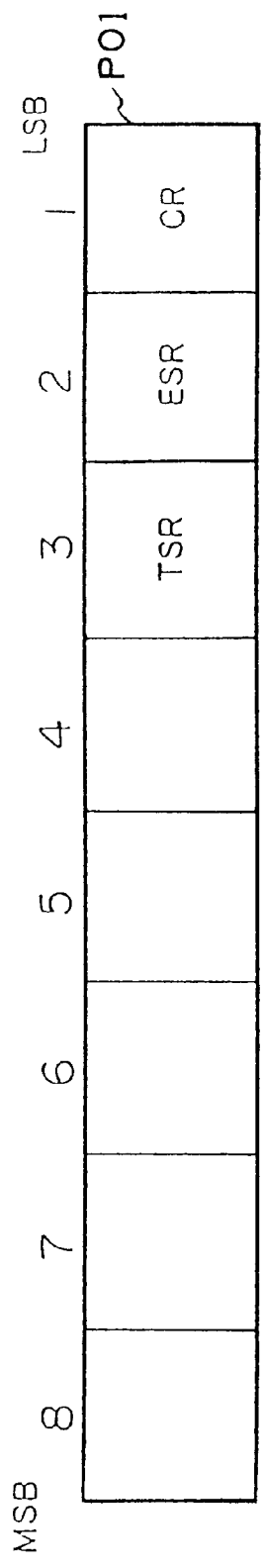
FIG. 3 is an explanatory view showing a format of a cell.

When the cell is used as a buffer control cell, in the first octet PO1 of the payload CP, control information for overflow control is included. FIG. 3 is an explanatory view of the first octet PO1 of the payload CP in the cell. As shown in FIG. 3, in the first octet, control bits for overflow control are respectively set to the first through the third bits between MSB (most significant bit) and LSB (least significant bit).

Concretely, TSR (Transfer Stop Request-bit) is set to the third bit of the first octet PO1. The TSR shows a request to the SARC 25 to stop transmitting cells to the switch unit 40. When the TSR is "1", the TSR shows a request to stop transmitting cells, and when the TSR is "0", the TSR shows that it is not required to stop transmitting cells.

In the second bit of the first octet PO1, ESR (Ethernet interface Stop Request-bit) is set. The ESR indicates a request to the LANC 21 to stop receiving a frame from the LAN 120. When the ESR is "1", the ESR indicates a request to stop receiving frames, and when the ESR is "0", the ESR shows that it is not required to stop receiving frame.

In the first bit of the first octet PO1, CR (Collision Request-bit) is set. The CR indicates that a collision is generated in the LAN 120. When the CR is "1", the CR indicates to request to generate a collision, and when the CR is "0", the CR indicates that it is not required to generate a collision.

As above described, the cell, in witch a bit showing "AA" is set, in the third octet PO3 of the payload CP and TSR, ESR and CR are set to the first through the third bits of the first octet PO1 becomes the above-described buffer control cell. The CPU 22, when detecting a buffer control cell, checks contents of the TSR, the ESR and the CR and executes a process corresponding to the checked result.

<Buffer Control Cell Transmission Process>

Next, an explanation will be given of the buffer control cell transmission process executed in the card with referring to FIGS. 4 through 7. Note that the CPU 22 starts this buffer control cell transmission process after the VCC for data communication is established between the LAN 120 and other LAN .

Figure 4:
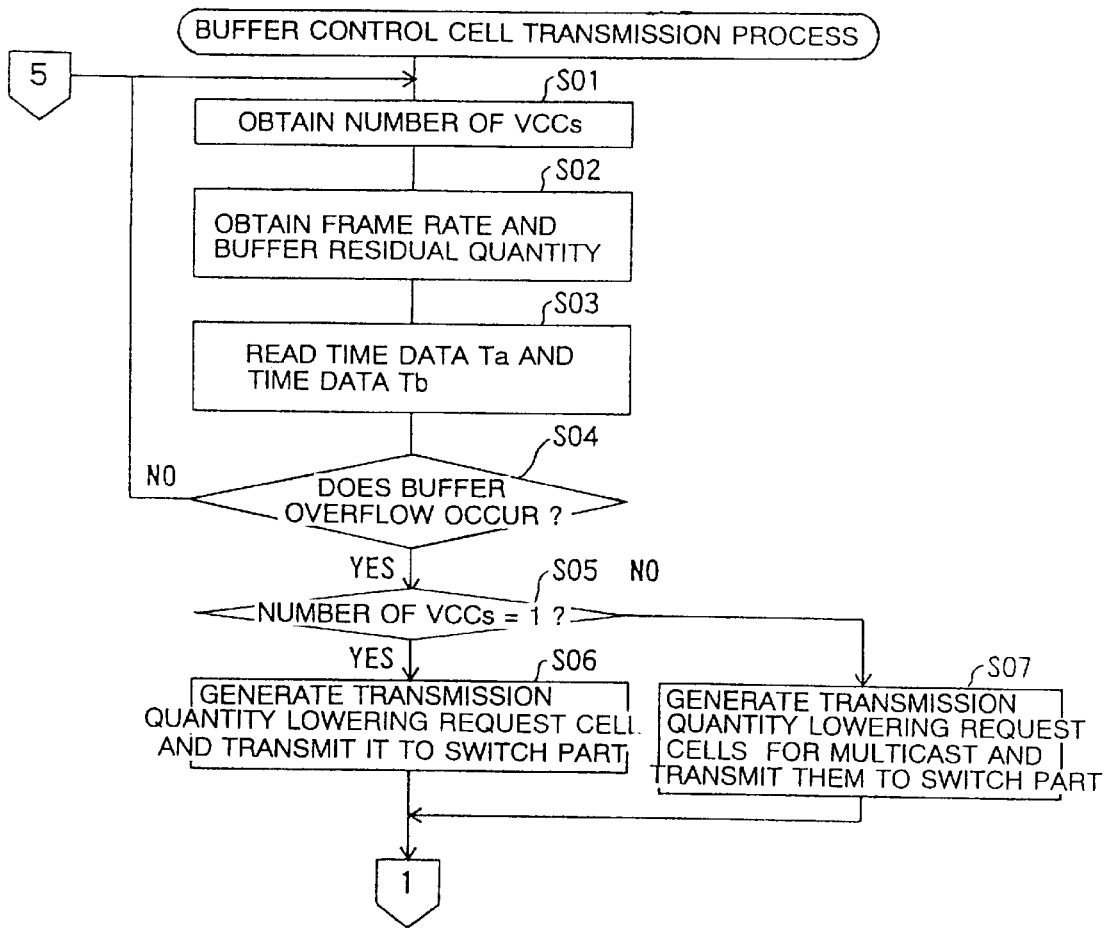
FIG. 4 is a flowchart showing a buffer control cell transmission process.

As shown in FIG. 4, when the buffer control cell transmission process starts, the CPU 22 in the card 20 obtains the number of VCCs established for the data communication between the LAN 120 and other LAN (step S01). Then, the CPU 22 obtains frame rates (frame increment number per unit time) and buffer residual quantity as to the downward buffer 23 (see FIG. 11(A)) and the upward buffer 24 (step S02) and reads a time data Ta and a time data Tb held therein (step S03). The time data Ta is data of time necessary to transmit a transmission quantity lowering request cell, which is a buffer control cell, from the SARC 25, and the time data Tb is data of time after each of the cards 30, 80 and 90 receives the transmission quantity lowering request cell till the cell transmission quantity lowering process is completed.

Then, the CPU 22 forecasts whether or not buffer overflow will occurs in the downward buffer 23 (step S04) by judging whether or not the frame rate, buffer residual quantity time data Ta and time data Tb satisfy the following inequality.

$$\text{Buffer residual quantity/Frame rate} \leq Ta+Tb$$

When the inequality is satisfied (Step S04:YES), the CPU 22 judges that the overflow will occur in the downward buffer 23 and advances the process to Step S05. When the inequality is not satisfied, the CPU 22 judges that no overflow will occur and returns the process to Step S01.

The CPU 22, when advancing the process to Step S05, judges whether the VCC established between the LAN 120 and the other LAN at this stage is 1 or not. The CPU 22, when judging that the number of the VCC is 1 (Step S05: YES), advances the process to Step S06. On the contrary, the CPU 22, when judging that the number of the VCC is not 1 (is plural) (Step S05: NO), advances the process to Step S07.

The CPU 22, when advancing the process to Step S06, generates a transmission quantity lowering request cell and transmits it to the switch unit 40. That is, the CPU 22 specifies the VCC established for data communication between the LAN 120 and the other LAN and gives the SARC 25 an instruction to generate a transmission quantity lowering request cell with identification information of the specified VCC.

The SARC 25 receiving the instruction generates a transmission quantity lowering request cell, namely, a cell in which "AA" is set in the third octet PO3 of the payload CP and "1" is set to only the TSR in the first octet PO1. Then, the SARC 25 transmits the transmission quantity lowing request cell to the switch unit 40.

Figure 9:
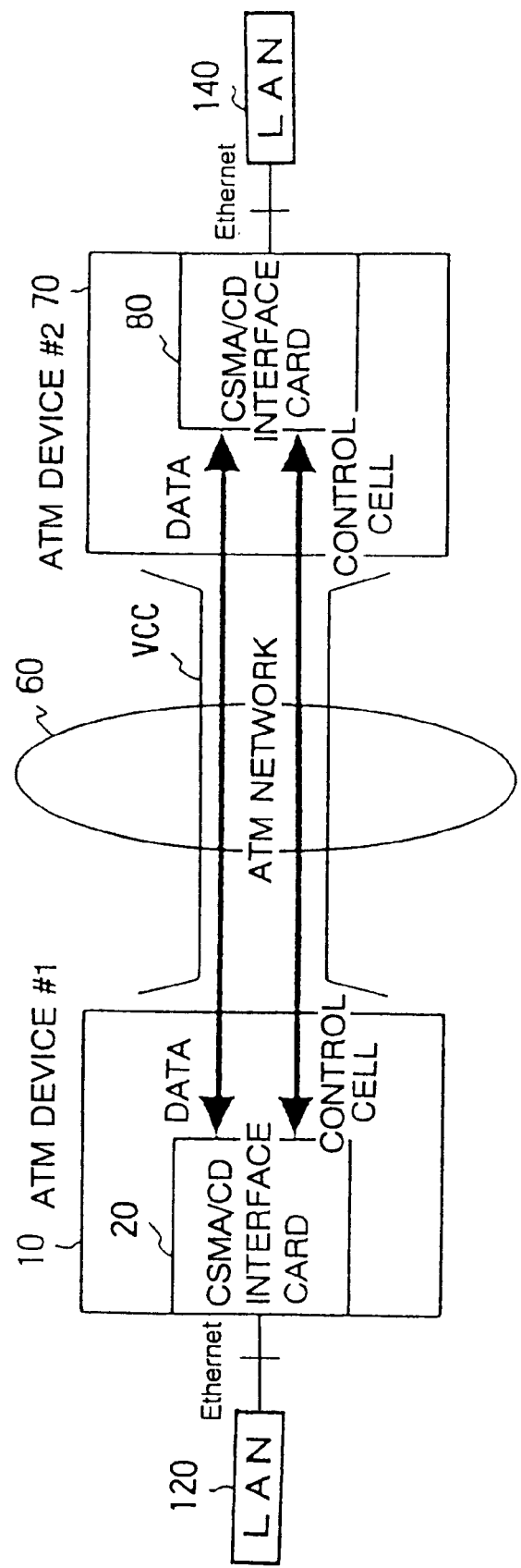
FIG. 9 is a principle explanatory view showing the embodiment.

Thereafter, the transmission quantity lowering request cell is transmitted through the VCC established for data communication between the LAN 120 and the other LAN by the switch unit 40 (refer to FIG. 9). For example, when the VCC is established between the LAN 120 and the LAN 140, the transmission quantity lowering request cell is transmitted from the ATM device 10 through the switch unit 40 and the port 50. Then, the transmission quantity lowering request cell is received by the card 80 of the ATM device 70 through the ATM network 60. The cell transmission quantity lowering process is executed in the card 80 hereby.

The CPU 22, when advancing the process to Step S07, generates a transmission quantity lowering request cells for multicast and transmits them to the switch unit 40. That is, the CPU 22 give the SARC 25 an instruction to multicast a plurality of transmission quantity lowering request cells.

Figure 10:
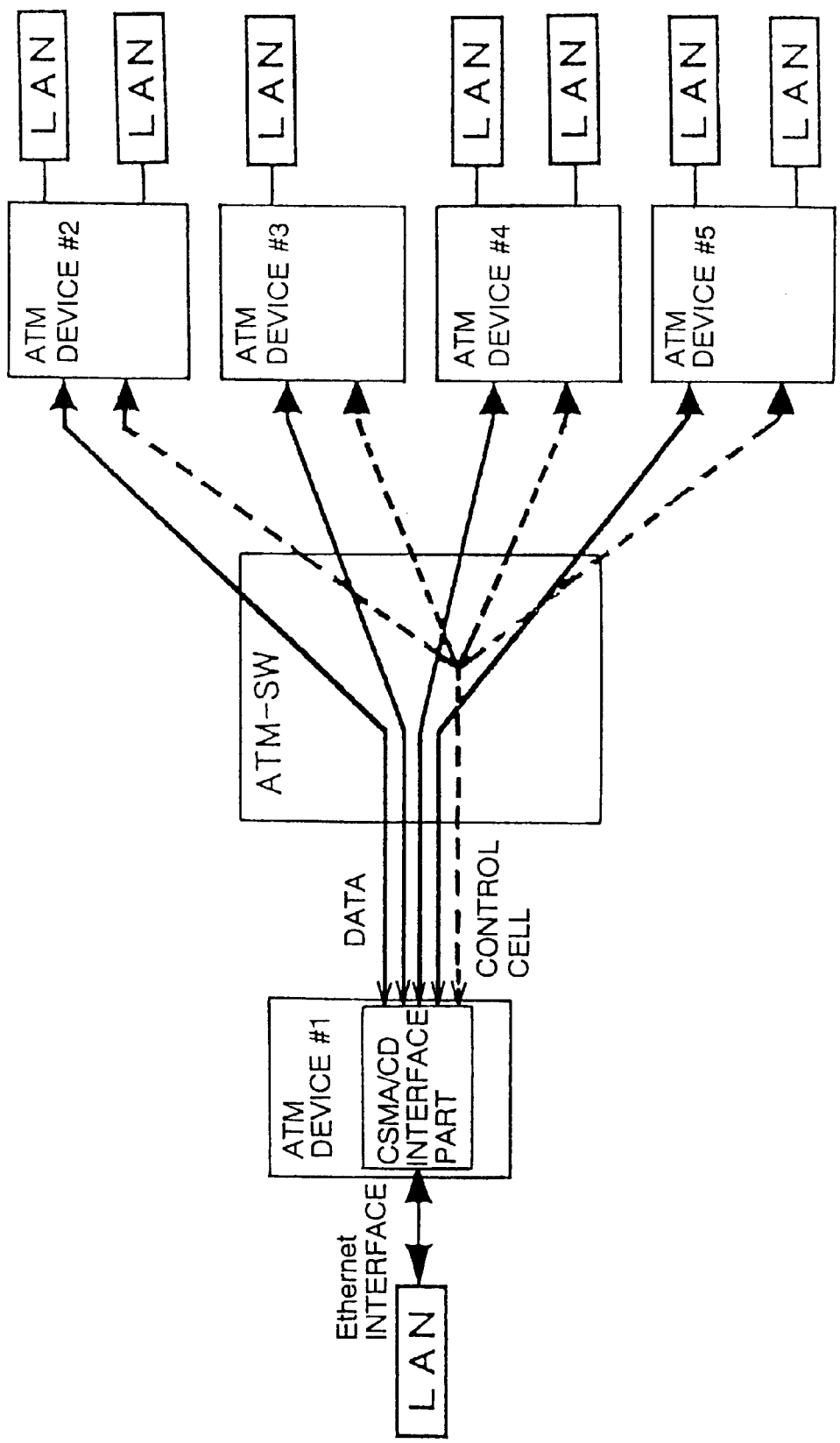
FIG. 10 is a principle explanatory view showing the embodiment.

The SARC 25 receiving the instruction generates a plurality of the transmission quantity lowering request cells. The SARC 25 transmits each transmission quantity lowing request cell to the switch unit 40. The switch unit 40, when receiving a plurality of transmission quantity lowering request cells, multicasts these transmission quantity lowering request cells with the point-to-multipoint connection function (refer to Principle View of FIG. 10; FIG. 10 is different from the network structure in this embodiment ).

In this way, with the process of Step S07, a plurality of transmission quantity lowering request cells are multicast. Thus, the transmission quantity lowering request cell reaches another ATM device (card) faster than the case in that the switch unit 40 transmits the transmission quantity lowering request cells to the plural VCCs one by one. Accordingly, it is possible to shorten the time until the cell transmission quantity lowering process (overflow control) is executed in the other ATM device (card), therefore, it is possible to reduce a possibility that data overflows from the downward buffer 23.

Figure 5:
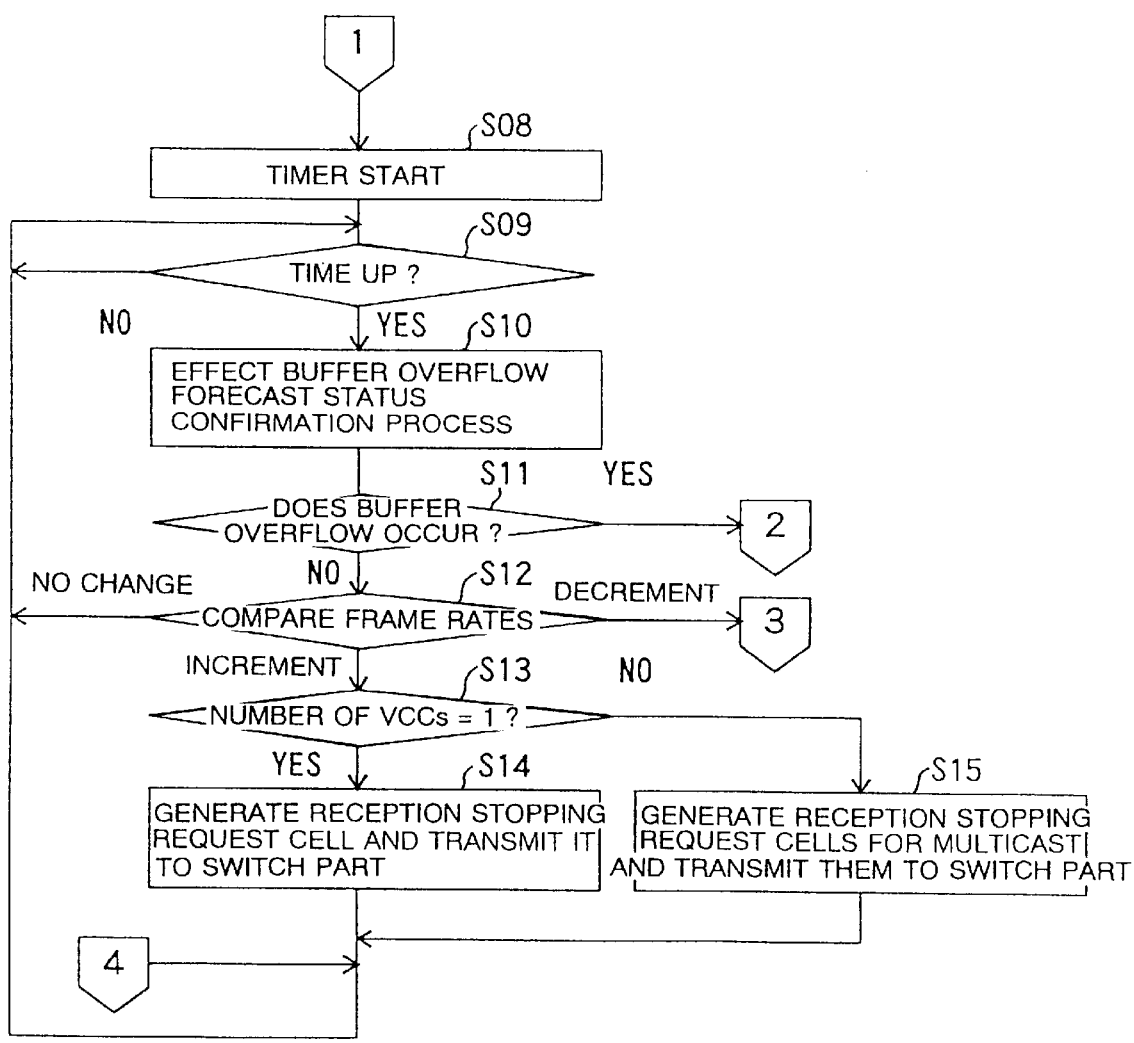
FIG. 5 is a flowchart showing a buffer control cell transmission process.

After transmitting one or more transmission quantity lowering request cell, the CPU 22, as shown in FIG. 5, starts a time count with a not-shown timer provided therein (Step S08). The CPU 22 judges whether the timer counts a predetermined time or not (whether time-up or not) (Step S09), and advances the process to Step S10 when the timer counts the predetermined time.

The CPU 22, when advancing the process to Step S10, executes the overflow forecast status confirmation process. Concretely, the CPU 22 obtains the frame rate as to the downward buffer 23. Successively, the CPU 22 judges whether or not a buffer overflow occurs in the downward buffer 23.

The CPU 22, when judging that a buffer overflow occurs (Step S11: YES), advances the process to Step S16 shown in FIG. 6. On the contrary, the CPU 22, when judging that no buffer overflow occurs (Step S11: NO), advances the process to Step S12.

The CPU 22, when advancing the process to Step S12, compares the frame rate obtained in Step S02 with that obtained in Step S10. The CPU 22 returns the process to Step S09 when the frame rates are equal. The CPU 22 advances process to Step S23 shown in FIG. 7 when the frame rate drops. The CPU 22 advances the process to Step S13 when the frame rate rises.

The CPU 22, when advancing the process to Step S13, judges whether the VCC established between the LAN 120 and the other LAN at the present is 1 or not. The CPU 22, when judging that the number of VCC is 1 (Step S13: YES), advances the process to Step S14. On the contrary, the CPU 22, when judging that the number of VCC is not 1 ( is plural) (Step S13: NO), advances the process to Step S15.

The CPU 22, when advancing the process to Step S14, specifies the VCC established between the LAN 120 and the other LAN and gives the SARC 25 an instruction to generate a reception stopping request cell with identification information of the specified VCC. The SARC 25 receiving the instruction generates a reception stopping request cell, that is a cell in which "AA" is set in the third octet PO3, and "1" is set to only ESR in the first octet PO1. The SARC 25 transmits the reception stopping request cell to the switch unit 40.

Thereafter, the reception stopping request cell is transmitted through the VCC established for data communication between the LAN 120 and the other LAN (refer to FIG. 9). For example, when the VCC is established for the data communication between the LAN 120 and the LAN 140, the reception stopping request cell is received by the card 80 of the ATM device 70 through the ATM network 60. With this, the frame reception stopping process is executed in the card 80.

The CPU 22, when advancing the process to Step S15, multicast a plurality of reception stopping request cells to the switch unit 40 by technique same as Step S07. Then, the CPU 22 returns the process to Step S09.

Figure 7:
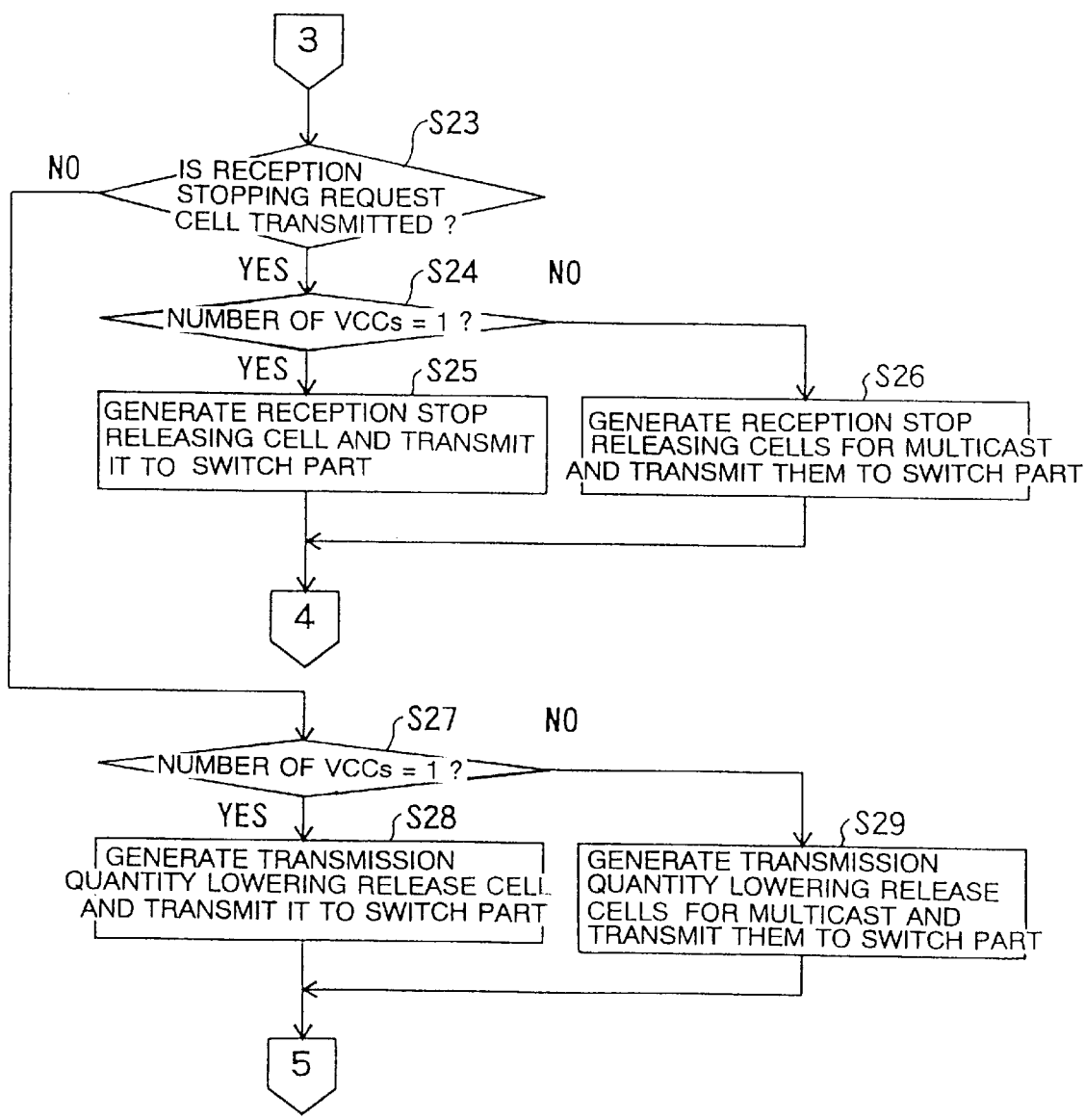
FIG. 7 is a flowchart showing a buffer control cell transmission process.

Now, the CPU 22, when advancing the process to Step S23 shown in FIG. 7, judges whether the reception stopping request cell is already transmitted or not. At this time, the CPU 22, when judging that the reception stopping request cell is already transmitted (Step S23: YES), advances the process to Step S24. On the contrary, the CPU 22, when judging that the reception stopping request cell is not yet transmitted (Step S23: NO), advances the process to Step S27.

The CPU 22, when advancing the process to Step S24, judges whether the VCC established between the LAN 120 and the other LAN at the present time is 1 or not. The CPU 22, when judging that the number of the VCC is 1 (Step S24: YES), advances the process to Step S25, and when judging that the number of VCC is not 1 (is plural) (step S24: NO), advances the process to Step S26.

The CPU 22, when advancing the process to Step S25, specifies the VCC established between the LAN 120 and the other LAN and gives the SARC 25 an instruction to generate a reception stop releasing cell with identification information of the specified VCC.

The SARC 25 receiving the instruction generates a reception stop releasing cell in which "AA" is set in the third octet PO3 and information indicating release of the frame reception stopping process is set in the first octet PO1, and transmits the cell to the switch unit 40. The reception stop releasing cell is transmitted through the VCC established for data communication between the LAN 120 and the other LAN (refer to FIG. 9). Then, the reception stop releasing cells received by the card 80 of the ATM device 70 through the ATM network 60 shown in FIG. 1. The frame reception stopping process executed in the card 80 is released hereby.

The CPU 22, when advancing the process to Step S27, gives the SARC 25 an instruction to multicast a plurality of reception stop releasing cells.

Then, the SARC 25 generates a plurality of reception stop releasing cells and multicasts them to the switch unit 40. As a result, all cards connected to other ATM devices communicating data with the LAN 120 receive the reception stop cells, and the frame reception stopping process executed in each card is released. The cell transmission quantity lowering process, however, is not released by this frame reception stopping process.

The CPU 22, when advancing the process to Step S27, specifies the VCC established between the LAN 120 and the other LAN and gives the SARC 25 an instruction to generate a transmission quantity lowering release cell with identification information of the specified VCC.

Then, the SARC 25 generates a transmission quantity lowering release cell in which "AA" is set in the third octet PO3 and information indicating release of the transmission quantity lowering process is set to the first octet PO1, and transmits the cell to the switch unit 40. The transmission quantity lowering release cell is transmitted through the VCC established for data communication between the LAN 120 and the other LAN. Then, the transmission quantity lowering release cell is received by the card 80 of the ATM device 70 through the ATM network 60. The transmission quantity lowering process executed in the card 80 is released hereby.

After transmitting one or more transmission stop release cell, the CPU 22 returns the process to Step S09.

The CPU 22, when advancing the process to Step S27, gives the SARC 25 an instruction to multicast a plurality of transmission quantity lowering release cells.

Then, the SARC 25 receiving the instruction generates a plurality of transmission quantity lowering release cells and gives them to the switch unit 40. The switch unit 40 multicasts a plurality of transmission quantity lowering release cells with the point-multipoint connection function. As a result, all cards connected to other ATM devices communicating data with the LAN 120 receive the transmission quantity lowering release cells, and the cell transmission lowering process executed in each card is released.

After transmitting one or more transmission quantity release cell, the CPU 22 returns the process to Step S01.

In this way, when an overflow forecast is made, a transmission quantity lowering request cell is transmitted to a card connected to a LAN to be a transmitting LAN. Quantity of cells received by the SARC 25 decreases hereby. When the frame rate of the downward buffer 23 continuously rises afterwards, the reception stopping request cell is transmitted so that the SARC 25 receives no cell.

Thereafter, when the frame rate of the downward buffer 23 falls, overflow controls are released in order of the frame reception stopping process and the cell transmission quantity lowering process. In this way, transmission of frames (cells) is controlled stage by stage, whereby it is prevented that the throughput of data communication between the LAN 120 and the other LAN falls needlessly.

Figure 6:
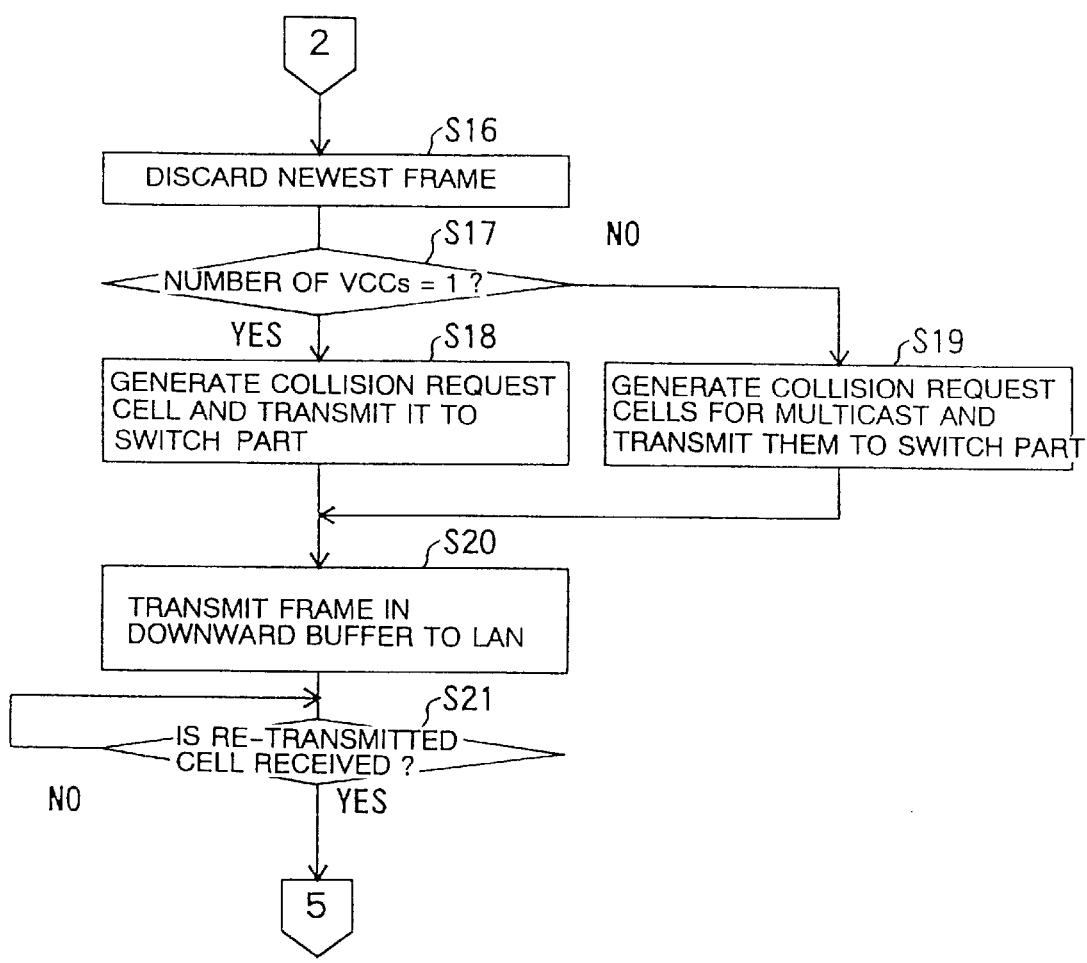
FIG. 6 is a flowchart showing a buffer control cell transmission process.
Figure 12:
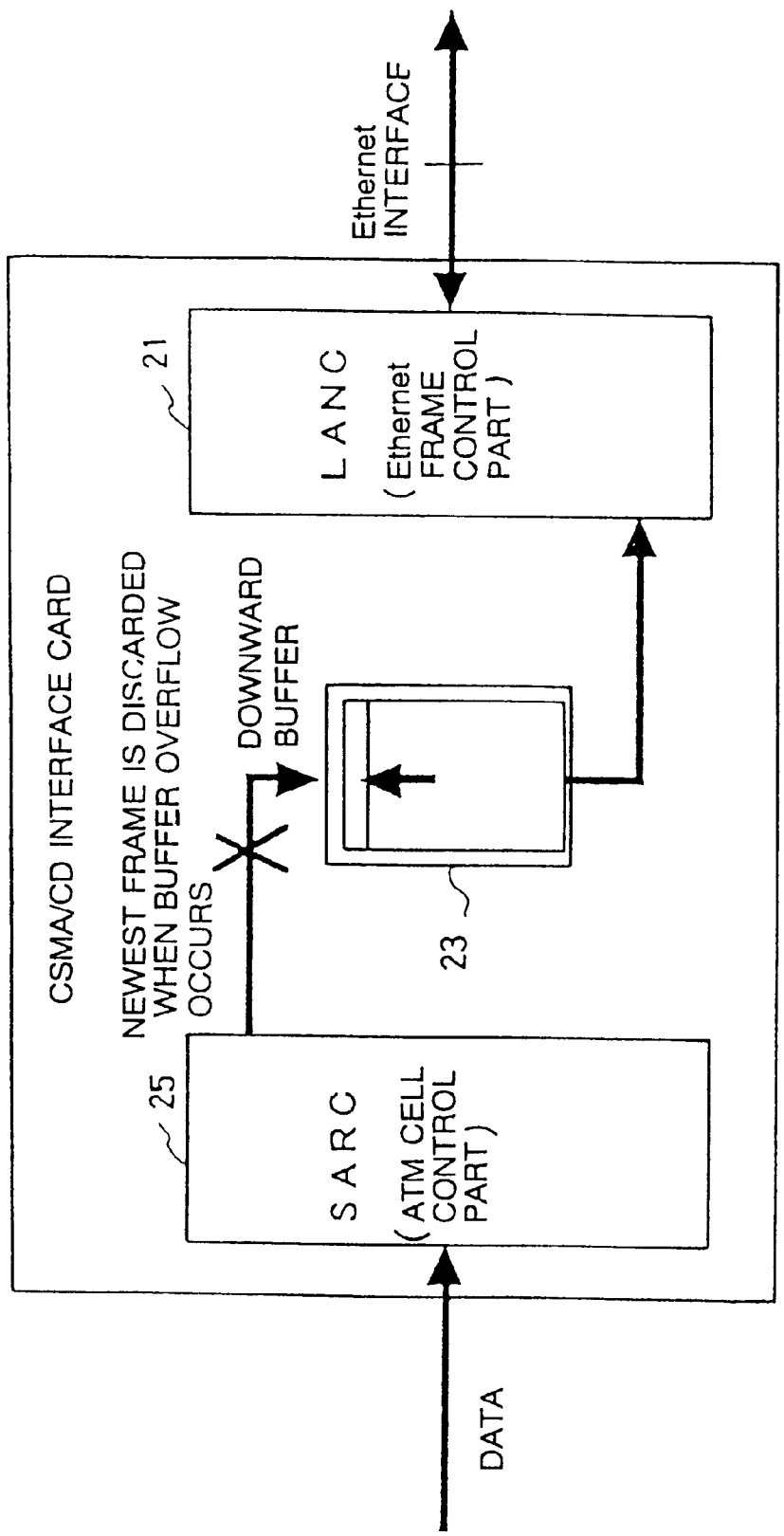
FIG. 12 is a principle explanatory view showing the embodiment.

Now, the CPU 22, when advancing the process to Step 16 shown in FIG. 6, discards a new frame (begins to discard the last-received frame) which will overflow from the downward buffer (refer to FIG. 12). For example, in a case that five frames are received, when an overflow occurs after storing three frames in the buffer, the fourth and fifth frames are discarded.

When frames are discarded like this, re-transmission procedure by frame lack is executed between the LAN 120 and the other LAN. This re-transmission procedure is executed by regarding the lacked frame as beginning. At this time, since the frame which is last received by the card 20 is first discarded by the process of Step 16, the re-transmission procedure can be executed by regarding the frame which is comparatively later transmitted from the other LAN to be a transmitting LAN as beginning. Thus, the number of frames to be re-transmitted by the other LAN reduces. Accordingly, it is possible to finish the re-transmission procedure more quickly. Thus, it is possible to prevent throughput degradation.

Successively, the CPU 22 judges whether the number of VCC used for data communication is 1 or not (Step S17). The CPU 22 advances the process to Step S18 when the number of VCC is 1 and advances the process to Step S19 when the number of VCC is not 1.

The CPU 22, when advancing the process to Step S18, lets the SARC 25 generate a collision request cell in which "AA" is set in the third octet PO3 and "1" is set to only CR in the first octet PO1, and transmit it to the switch unit 40.

Thereafter, the collision request cell is transmitted by the switch unit 40 through the VCC established for data communication between the LAN 120 and the other LAN. For example, when the VCC is established between the LAN 120 and the LAN 140, the collision request cell is received by the card 80 of the ATM device 70 through the ATM network 60. The collision request reply process is executed in the card 80 hereby.

In the collision request replay process (details will be described later), since the LAN 140 becomes in the same status as the case in that collision occurs, the frame transmission from the LAN 140 stops, and the re-transmission procedure is executed in the LAN 140 after a predetermined time passes.

The CPU 22, when advancing the process to Step S19, lets the switch unit 40 multicast the collision request cell. As a result, the collision request cell is received by all cards connected to the other LAN which transmits data, and the collision request replay process is executed in each card.

After transmitting one or more collision request cell, the CPU 22 advances the process to step 20. The CPU 22, when advancing the process to Step S20, gives the frames in the downward buffer 23 to the LANC 21 and lets the LAN 120 transmit them. At this time, since a collision occurs in other LAN which transmits data, the other LAN stops transmitting frames to the ATM device. As a result, the SARC 25 stop receiving cells. Accordingly, the frame rate in the downward buffer 23 reduces, and the status that data overflows from the downward buffer 23 is solved.

Then, the CPU 22 waits that the SARC 25 receives the re-transmitted cell (re-transmitted frame from other LAN) (Step S21) and returns the process to Step S01 when judging that the re-transmitted cell is received by the SARC 25.

In this way, when a buffer overflow occurs in the downward buffer 23, the collision request cell is transmitted, whereby the transmitting LAN becomes in a collision occurring status and stops transmitting frames. As a result, it is possible to reduce the data storage quantity in the downward buffer 23.

<Buffer Control Cell Reception Process>

Next, explanations will be given of the buffer control cell reception process executed in each of the cards 20, 30, 80, 90 for the overflow control. Here, the explanations will be given of the buffer control cell reception process with the card 20 as an example.

The CPU 22 in the card 20 is in a state (idle state) waiting that the SARC 25 receives the buffer control cell from the switch unit 40 while the card 20 is used for the data communication between LANs. The CPU 22 executes the buffer control cell reception process when the SARC 25 receives one of buffer control cells, such as the transmission quantity lowering request cell, the reception stopping request cell or the collision request cell.

<Cell Transmission Quantity Lowering Process>

First, with referring to FIG. 13, an explanation will be given of the cell transmission quantity lowering process which is started when the SARC 25 of the card 20 receives the transmission quantity lowering request cell.

When detecting that the buffer control cell received by the SARC 25 is the transmission quantity lowering request cell, the CPU 22 gives a transmission quantity lowering control signal to the SARC 25. The SARC 25 receiving the control signal reduces the transmission band (transmission rate) of cells for the switch unit 40 to half of the default value (initially set value) (Step S002). As a result, the transmission rate of cells from the SARC 25 to the switch unit 40 becomes one-half. Accordingly, it is possible to prevent that the frame rate rises in the card which receives the cells.

Figure 11:
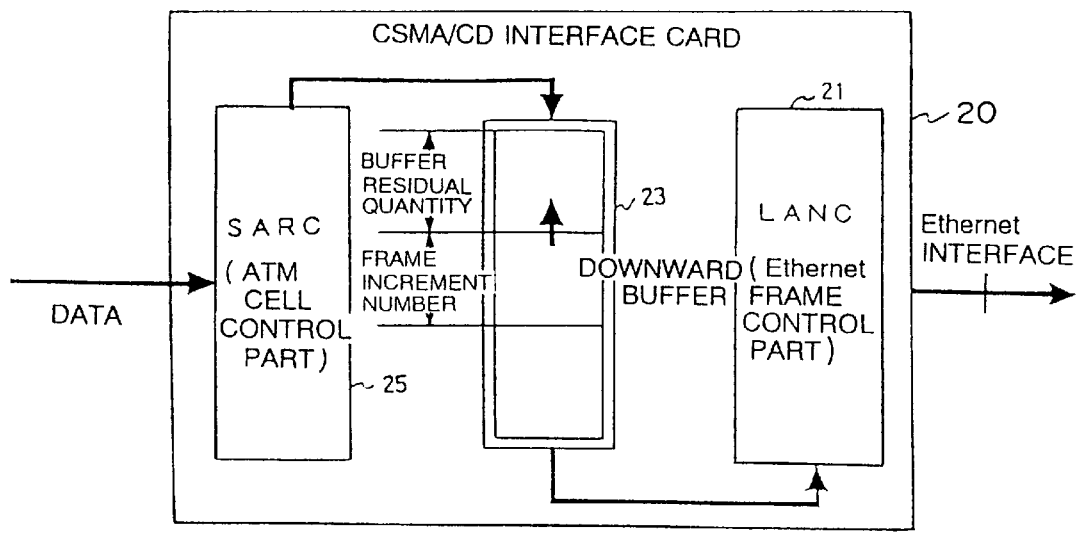
FIG. 11 is a principle explanatory view showing the embodiment.
Figure 11:
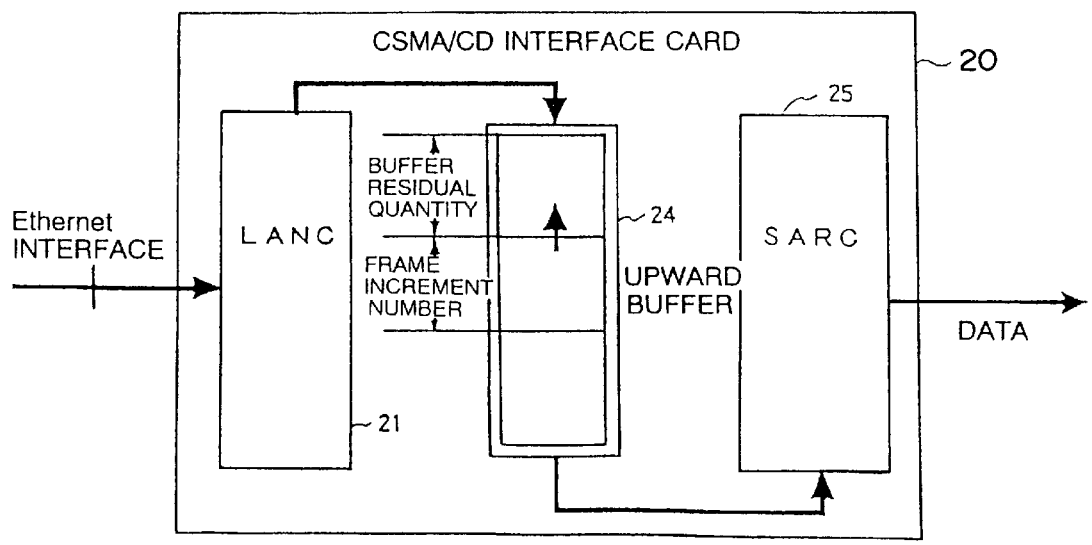

Successively, the CPU 22 forecasts whether or not an overflow will occurs in the upward buffer 24 (Step S003: refer to Steps S03–S05 in FIG. 4, and FIG. 11(B)) based on the frame rate, buffer residual quantity as to upward buffer 24 and time data Ta and time data Tb. At this time, when the overflow forecast is made (Step S003: YES), the CPU 22 advances the process to Step S004. On the contrary, when the overflow forecast is not made (Step S003: NO), the CPU 22 terminates the cell transmission quantity lowering process and goes in the idle state.

The CPU 22, when advancing the process to Step S004, gives a transmitting stop control signal to the SARC 25. Then, the SARC 25 stops transmitting cells to the switch unit 40. As a result, it is possible to further reduce a possibility that an overflow occurs in the downward buffer in the card receiving the cells.

Successively, the CPU 22 judges whether the LANC 21 is receiving frames from the LAN 120 or not (Step S005). The CPU 22 advances the process to Step S006 while receiving and advances process to Step S007 while not receiving (while transmitting).

The CPU 22, when advancing the process to Step S006, gives a control signal to the LANC 21. Then, the LANC 21 transmits a jam signal to the LAN 120 (Step S006). The CPU 22 shows the LAN 120 that a collision occurs in the LAN interface and generates a FCS (Flame Check Sequence) error in the LAN 120. The CPU 22 stops transmitting frames to the card 20. Thereafter, the CPU 22 advances the process to Step S008.

On the other hand, the CPU 22, when advancing the process to Step S007, judges whether frames which are transmitted at Step S005 are completely transmitted to the LAN interface (Ethernet interface). When frames are completely transmitted, the CPU 22 advances the process to Step S008. On the contrary, when frames has been just transmitted, the process of Step S007 is executed till YES is determined in this step S007.

The CPU 22, when advancing the process to Step S008, continuously transmits carrier signals as dummy signals from the LANC 21 to the LAN 120. As a result, the LAN 120 judges that the LANC 21 is used for frame transmission, and no frame is transmitted to the LANC 21 from the LAN 120.

Accordingly, since no frame (cell) is transmitted to the card at the down side of the card 20 (switch unit 40), it is possible to lower the frame rate of the downward buffer of this card. Thereafter, the CPU 22 terminates the cell transmission quantity lowering process, and returns in the idle state.

The cell transmission quantity from the SARC 25, which becomes one-half by this cell transmission quantity lowering process, returns to the original quantity by that the card 20 receives the transmission quantity lowering release cell. That is, when the SARC 25 receives the transmission quantity lowering release cell from the switch unit 40, the CPU 22 detects this transmission quantity lowering release cell and sets the transmission rate of cells from the SARC 25 to the default value.

<Frame Reception Stopping Process>

Figure 14:
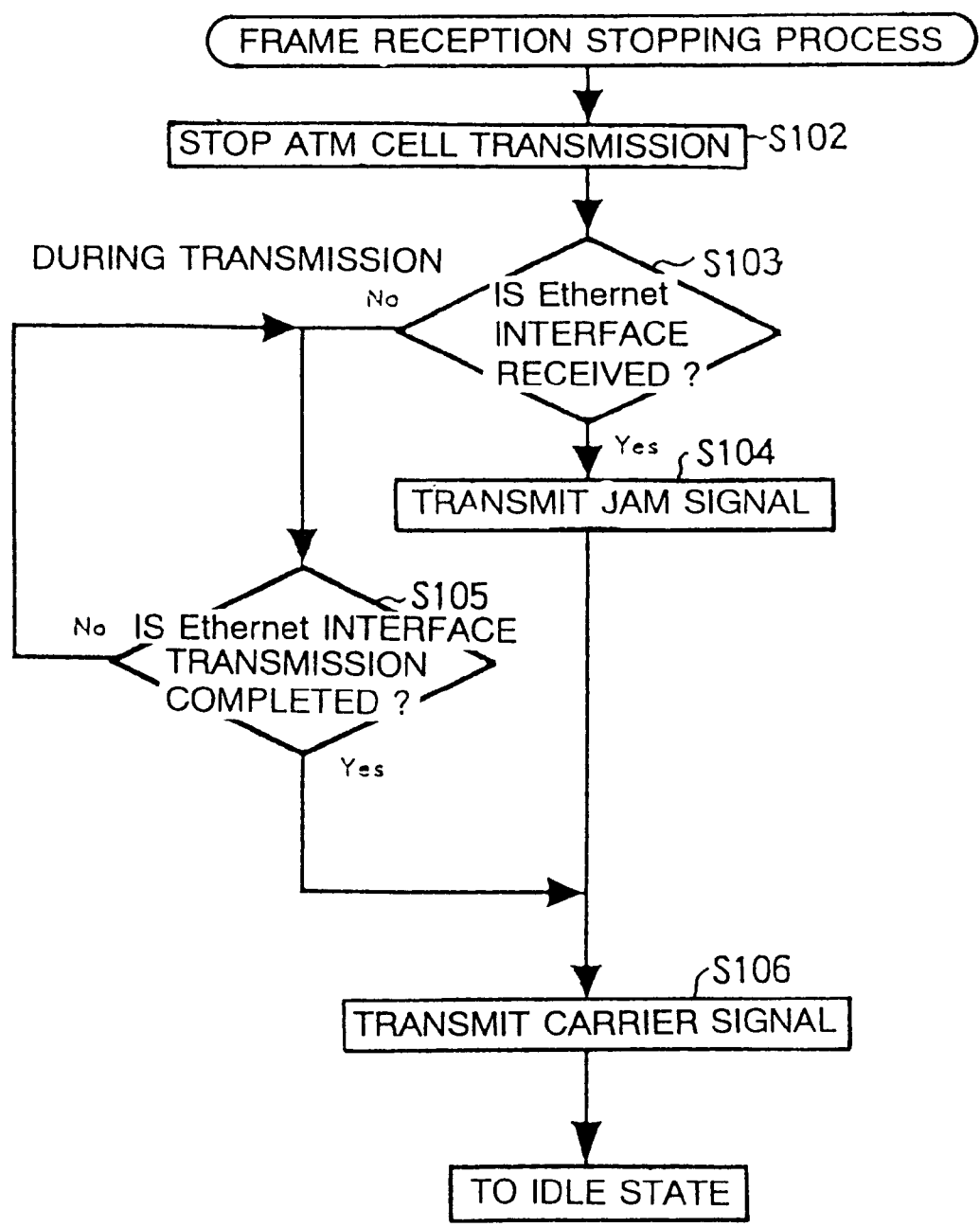
FIG. 14 is a flowchart showing a frame reception stopping process.

FIG. 14 is a flowchart showing the frame reception stopping process. The SARC 25 of the card receives the transmission quantity lowering request cell, whereby this frame reception stopping process starts.

Figure 13:
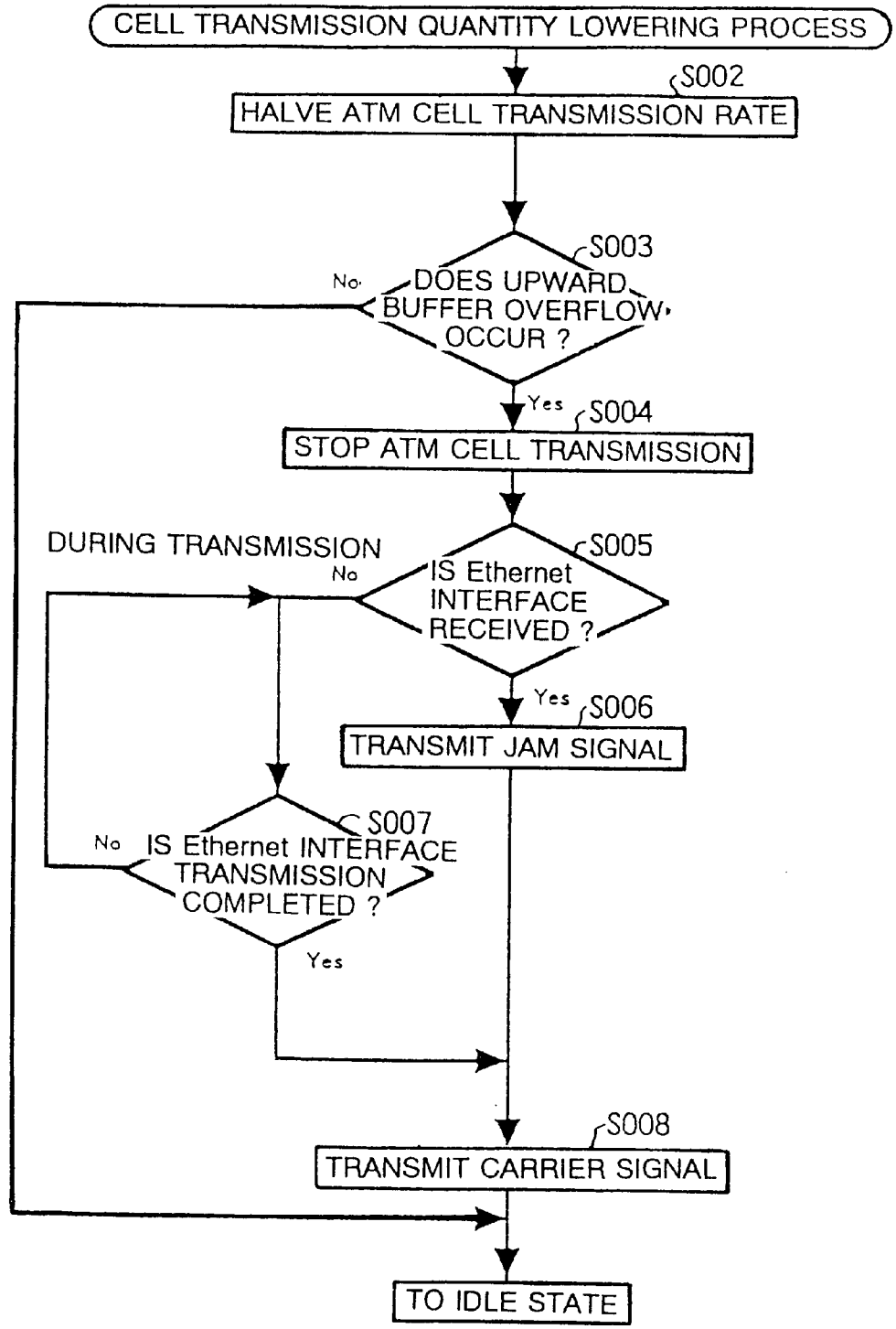
FIG. 13 is a flowchart showing a cell transmission quantity lowering process.

As shown in FIG. 14, the CPU 22 detecting that the SARC 25 receives the frame reception stopping request cell executes the processes of Steps S102 through S106 which are similar to those of Steps S004 through S008 shown in FIG. 13.

Figure 15:
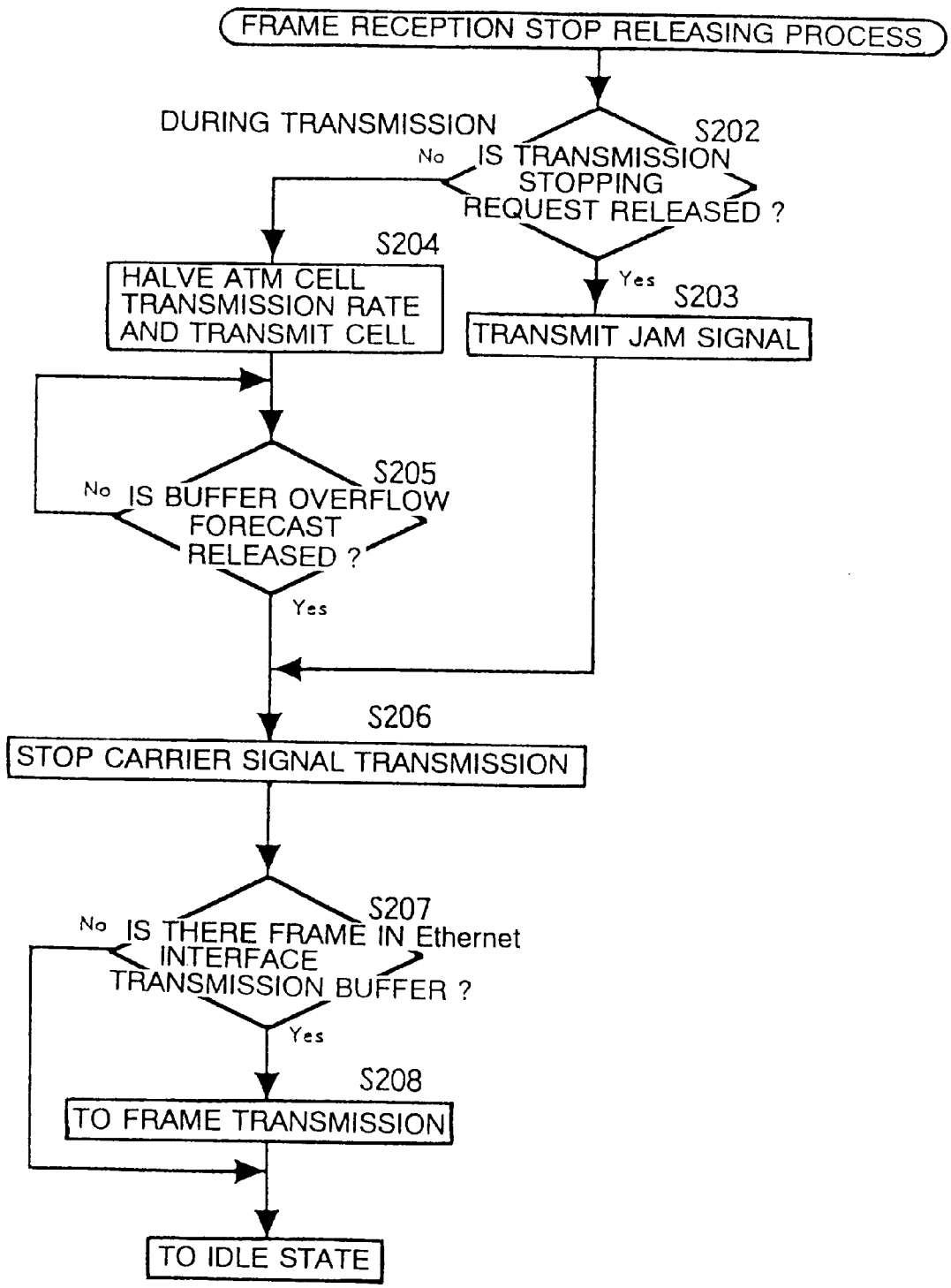
FIG. 15 is a flowchart showing a frame reception stop releasing process.

This frame reception stopping process is released by the frame reception stop releasing process. FIG. 15 is a flowchart showing the frame reception stop releasing process. This process starts by that the SARC 25 receives the reception stop releasing cell.

When the process starts, the CPU 22 judges whether the transmission stopping request is released or not, namely, whether the cell transmission rate from the SARC 25 returns to the default value or not. The CPU 22, when judges that the transmission stopping request is released (step S203: YES), advances the process to Step S203. On the contrary, the CPU 22 judges that the transmission stopping request is not released (Step S203; NO), advances the process to Step S204.

The CPU 22, when advancing the process to Step S203, advances the process to Step 206 after transmitting the jam signal to the LAN 120 from LANC 21.

On the other hand, CPU 22, when advancing the process to Step S204, sets the cell transmission rate from the SARC 25 to one-half of the default value. As a result, cells are transmitted from the SARC 25 in the transmission quantity of one-half of the default value. Successively, the CPU 22 obtains the frame rate of the upward buffer 24, thereby judging whether the overflow forecast as to the upward buffer 24 is released or not (Step S205), and stops transmitting the carrier signal to the LAN 120 when the overflow forecast is released (Step S206). As a result, the card 20 becomes in a state capable receiving frames from the LAN 120.

Thereafter, the CPU 22, when advancing the process to Step S207, judges whether a frame is stored in the downward buffer 23. When a frame is stored in the downward buffer 23 (Step S207; YES), the CPU 22 returns to the idle state after the frame is transmitted from the LANC 21 to the LAN 120. On the contrary, when no frame is stored in the downward buffer 23, the CPU 22 returns to the idle state. The CPU 22 returns to the idle state, whereby the frame reception stopping process is finished.

<Collision Request Reply Process>

Next, an explanation will be given of the collision request reply process. When detecting that the SARC 25 receives the collision request cell, the CPU 22 makes the LANC 21 transmit jam signal to the LAN 120 for a predetermined time. As a result, a collision occurs in the LAN 120, and frame transmission from the LAN 120 to the card 20 stops. Then, the collision request process is finished when transmission of jam signals is finished.

[Operational Example of Network System]

Next, an explanation will be given of the operational example of the network system according to this embodiment. For example, in the network system shown in FIG. 1, an explanation will be given of the operational example of the network system in which data communication is executed between the LAN 120 and the LAN 130 and between the LAN 130 and the LAN 140.

It is assumed that one VCC for data communication is established between the LAN 120 and the LAN 130 and one VCC is established between the LAN 130 and the LAN 140. Further, it is assumed that the LAN 130 is the down side and receives frame from each of the LAN 120 and the LAN 140.

Frame transmitted from the LAN 120 is stored in the upward buffer 24 through the LANC 21 in the card 20, and is transmitted from the SARC 25 as cells. Cells transmitted from the SARC 25 are received by the SARC 35 of the card 30 through the switch unit 40, and stored in the downward buffer 33 as a frame. Then, the frame stored in the downward buffer 33 is transmitted to the LAN 130.

Similarly, the frame transmitted from the LAN 140 is transmitted through the card 80, the switch unit 100, the port 110, the ATM network 60, the port 50 and the switch unit 40, and stored in the downward buffer 33 of the card 30, thereafter, transmitted to the LAN 130. As a result, the LAN 130 receives frames from both of the LAN 120 and the LAN 140.

At this time, the CPU 32 of the card 30 monitors the storage quantities in the downward buffer 33 and the upward buffer 24, and judges whether a overflow forecast occurs in the downward buffer 33 or the upward buffer 34 (Step S04: refer to FIG. 4). When the LAN 120 and the LAN 140 are based on 100BASE-TX and the LAN 130 is based on 10BASE-5, the transmission speed of frame of the LAN 130 is one-tenth of that of the LAN 120 and the LAN 140. As a result, a lot of frames are stored in the downward buffer 33 of the card 30.

When an overflow forecast occurs as to the downward buffer 33 of the card 30 (Step S04; YES), the transmission quantity lowering request cell for multicast is generated in the SARC 35, and is transmitted to each of the cards 20, 80 from the switch unit 40 (Step S07).

When the transmission quantity lowering request cell is received by the SARC 25 of the card 20, the cell transmission quantity lowering process (refer to FIG. 13) is executed in the card 20. As a result, the cell transmission quantity from the SARC 25 becomes one-half of the default value (Step S002). Similarly, the cell transmission quantity lowering process is executed in the card 80, whereby the cell transmission quantity from the SARC 85 becomes one-half of the default value (Step S002).

Figure 16:
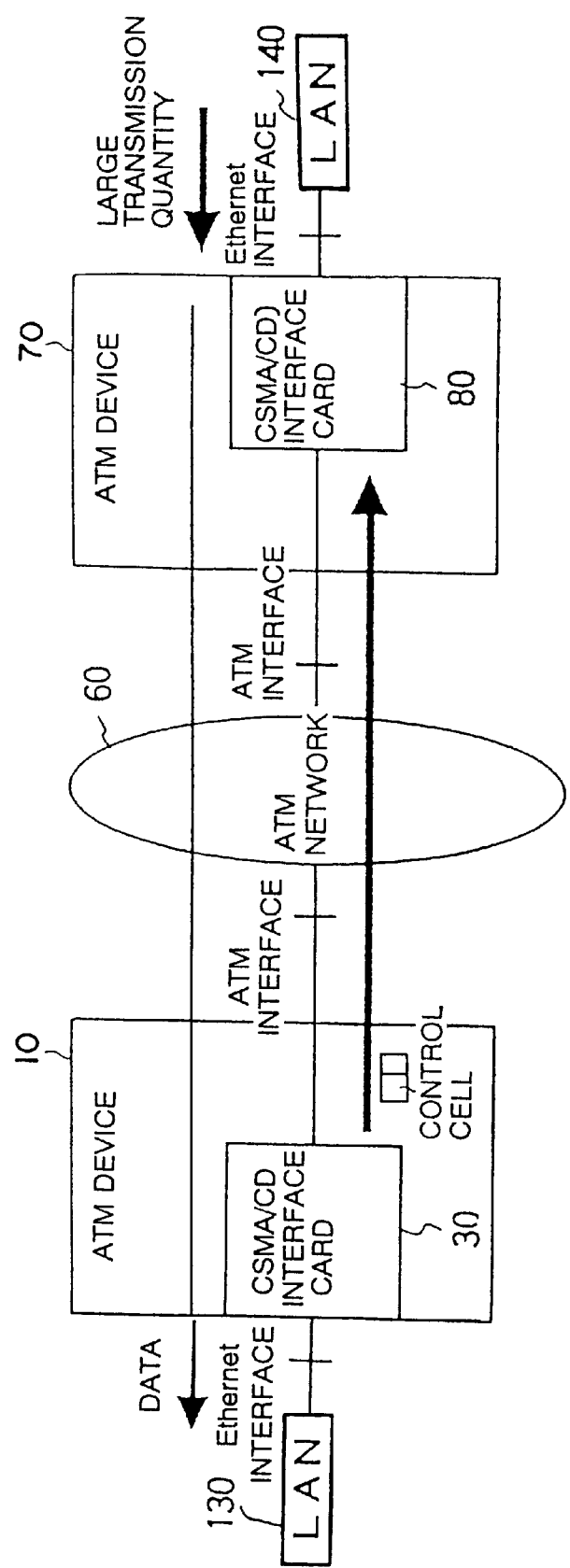
FIG. 16 is a principle explanatory view showing an embodiment.

In this way, the card 30 can control the cell transmission quantity of the card 80 which is apart from the card 30 (refer to Principle of FIG. 16). As a result, the number of cells received by the SARC 35 reduces, therefore, it is possible to prevent the overflow of the downward buffer 33.

However, it is assumed that the frame rate of the downward buffer 33 rises after executing the cell transmission quantity lowering process (Step S13). Then, the reception stopping request cell is transmitted from the switch unit 100 of the card 30 to the cards 20, 80 (Step S15).

When the reception stopping request cell is received by the card 20, the frame reception stopping process (refer to FIG. 14) is executed in the card 20. As a result, the CPU 22 stops transmitting cells from the SARC 25 (Step S102). Similarly, the frame reception stopping process is executed in the card 80, and the CPU 82 stops transmitting cells from the SARC 85 (Step S102). As a result, no cell is received by the SARC 25 of the card 20. Accordingly, it is possible to further prevent the overflow in the downward buffer 23 of the card 20.

Thereafter, in the card 20 and thee card 80, since cell transmission to the switch unit 40 or the switch unit is stopped, data storage quantities of the upward buffer 24 and the upward buffer 84 rise, whereby there is a possibility that an overflow occurs in the upward buffer 24 or the upward buffer 84. In view of this, the CPU 22 and the CPU 82 transmits jam signal to the LAN 120 and the LAN 140 (Step S104).

As a result, collisions occur in the LAN 120 and the LAN 140, therefore, frame transmission from the LAN 120 to the card 20 and frame transmission from the LAN 140 to the card 80 stop. Thereafter, carrier signals are transmitted to the LAN 120 and the LAN 140 (Step S106).

Here, the LAN 120 and the LAN 140 are Ethernet and adopt half duplex communication line method. Thus, while the carrier signals (such as frames to which no address is specified) are transmitted from the card 20 and the card 80, the LAN 120 and the LAN 140 cannot transmit frames to the card 20 or the card 80. That is, the card 20 and the card 80 receives no frame. Accordingly, is possible to prevent the overflow in each of the upward buffers 24, 84.

Now, no cell is received by the SARC 35 of the card 30 while cell transmission from the SARC 25 of the card 20 and the SARC 85 of the card 80 stop. Thus, frames are transmitted from the LANC 31 to the LAN 130, whereby the frame rate of the downward buffer 33 lowers (Step S12). Then, in the card 30, the reception stop releasing cell is multicast by the switch unit 100 (Step S26). Accordingly, the reception stop releasing cell is received by the cards 20, 80, 90.

When the reception stop releasing cell is received by the card 20 and the card 80, in each of the cards 20, 80, the frame reception stop releasing process (refer to FIG. 15) is executed. As a result, the CPU 22 and the CPU 82 raise the cell transmission quantity from the SARC 25 or the SARC 85 to one-half of the default value (Step S204). As a result, the SARC 25 of the card 20 starts to transmit cells again.

Thereafter, when the frame rates of the upward buffer 24 of the card 20 and the upward buffer 84 of the card 80 fall and the overflow forecast as to these are released (Step S205;YES), transmission of the carrier signals to the LAN 120 and the LAN 140 stops (Step S206). Accordingly, the card 20 and the card 80 become the status capable of receiving frames transmitted from the LAN 120 or the LAN 140. As a result, data communication starts again between the LAN 120 and the LAN 130 and between the LAN 130 and the LAN 140.

Thereafter, when the frame rate of the downward buffer 33 in the card 30 further falls, the transmission quantity lowering release cell is multicast from the switch unit 100 (Step S29). When the transmission quantity lowing release cell is received by the card 20 and the card 80, the cell transmission rates of the SARC 25 and the SARC 85 are set to the default value. As a result, data communication returns to the normal status completely.

Figure 17:
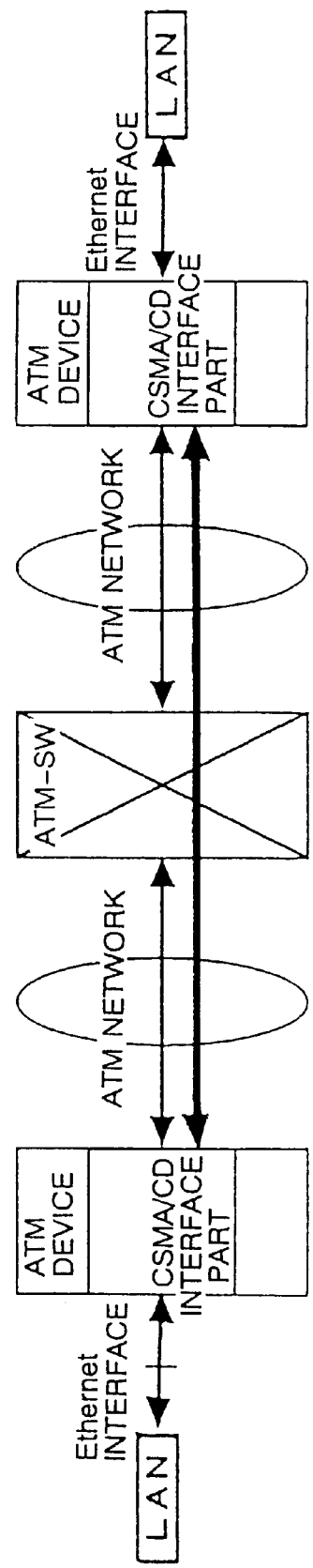
FIG. 17 is a principle explanatory view of a modification of the embodiment.

In this embodiment, the network system is structured as shown in FIG. 1, however, for example, a network system may be structured as shown in FIG. 17.

Figure 18:
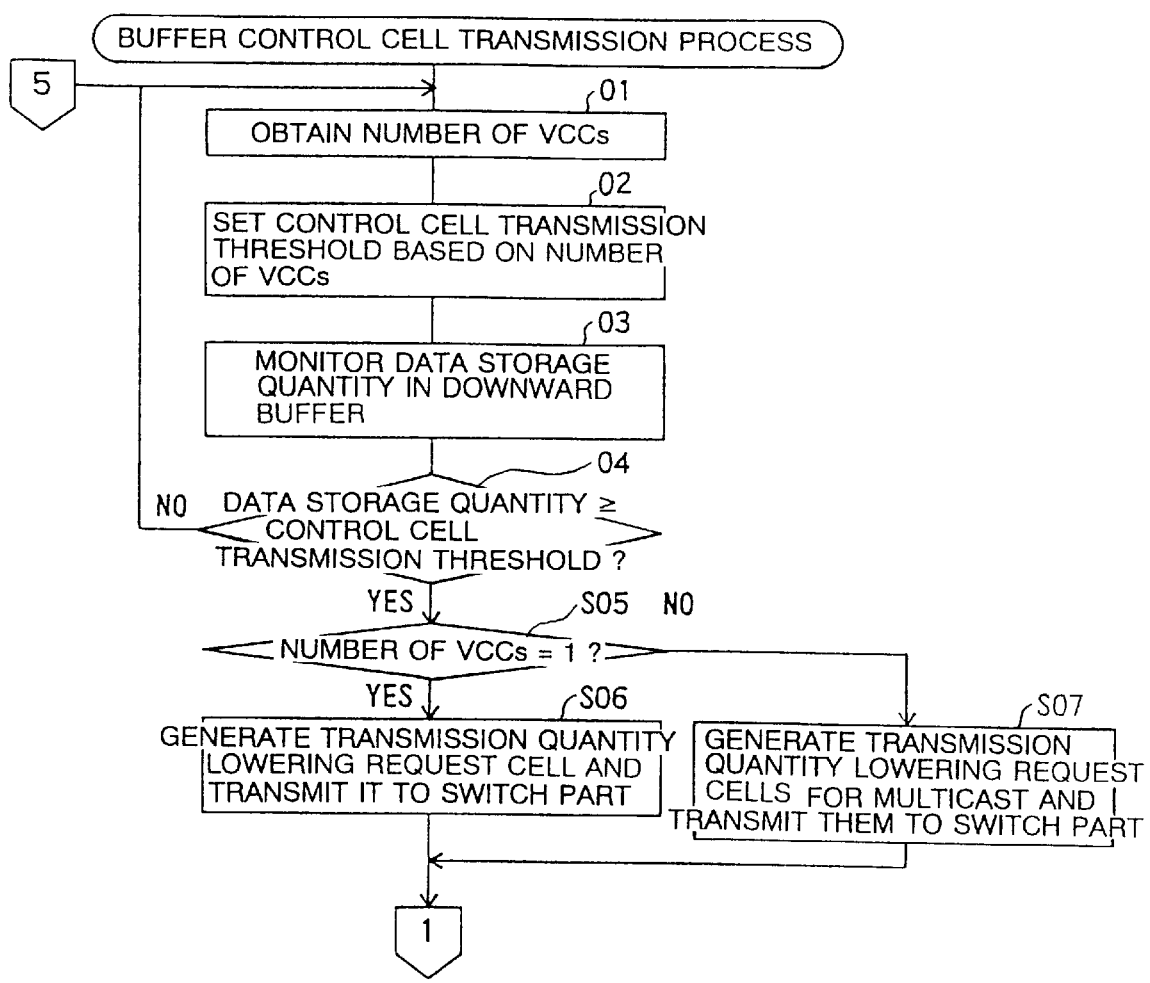
FIG. 18 is a flowchart showing the modification of the embodiment.
Figure 19:
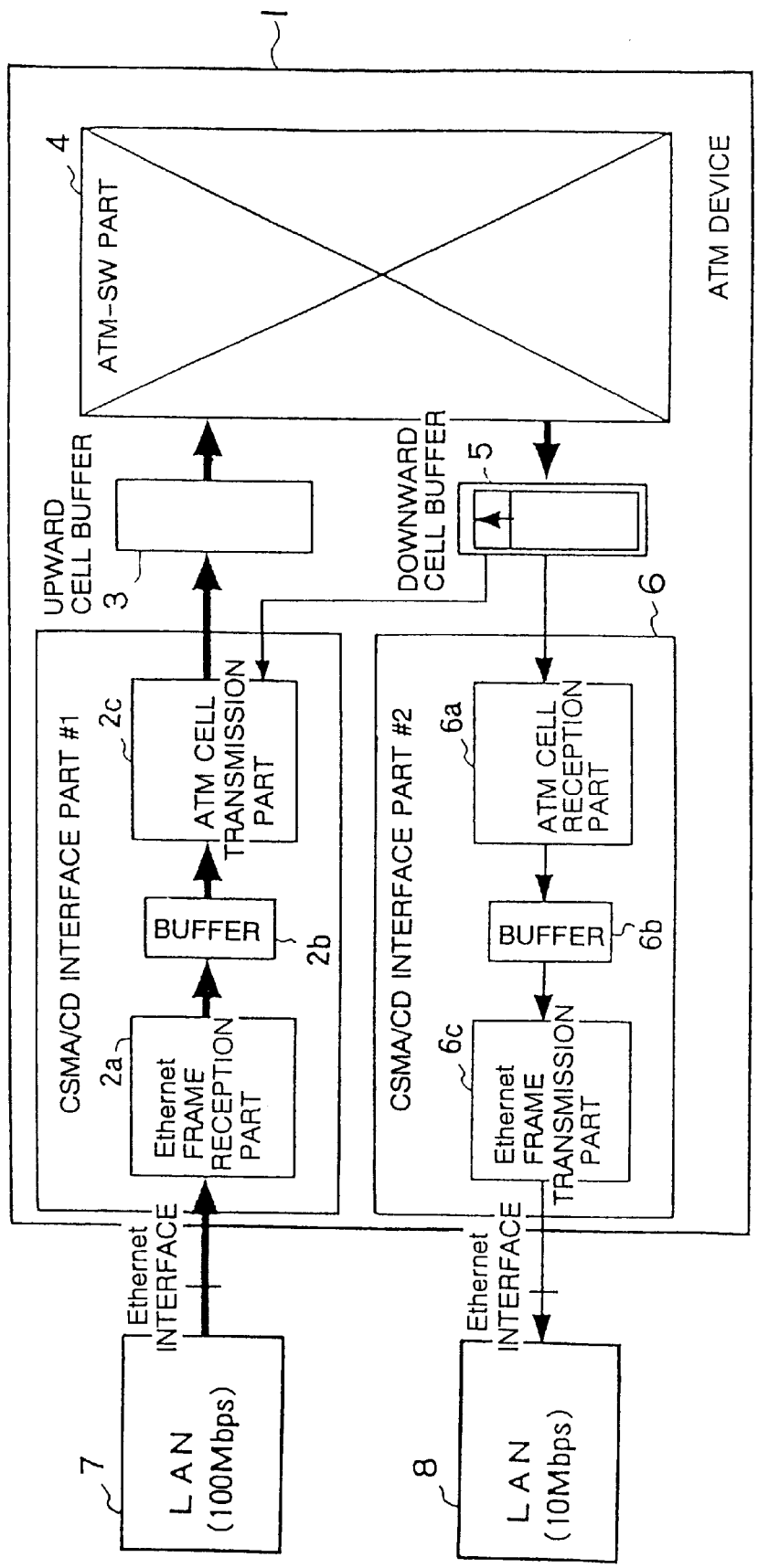
FIG. 19 is an explanatory view of the prior art.
Figure 20:
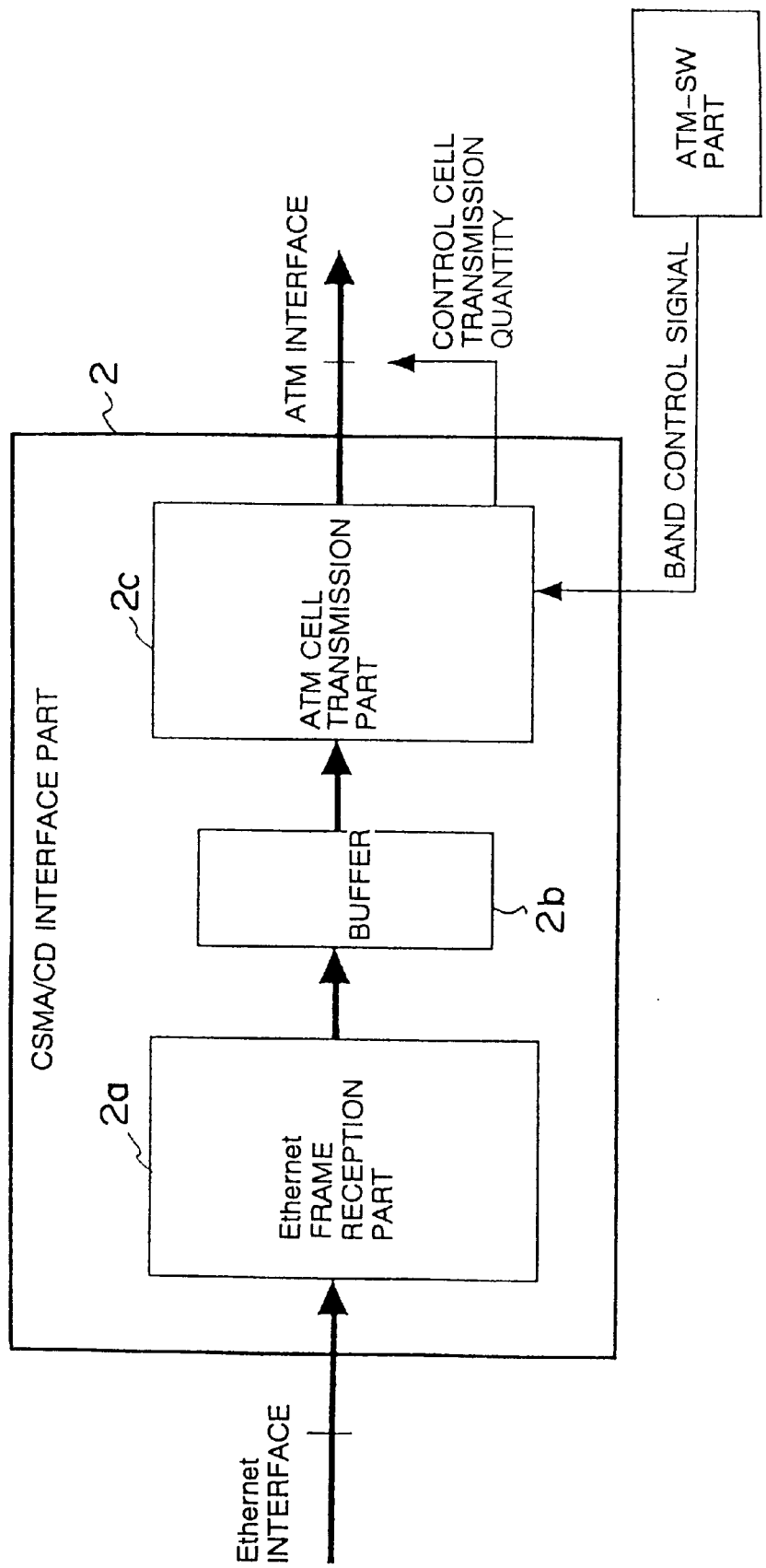
FIG. 20 is an explanatory view of the prior art.
Figure 21:
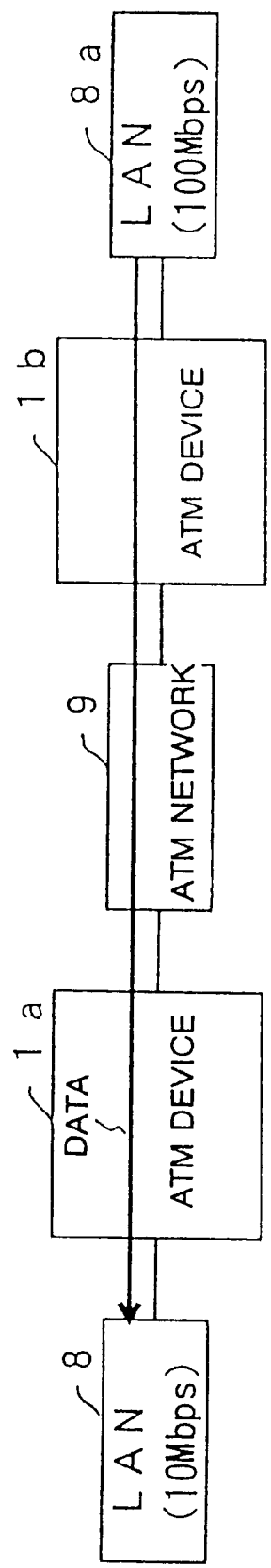
FIG. 21 is an explanatory view of the prior art.
Figure 22:
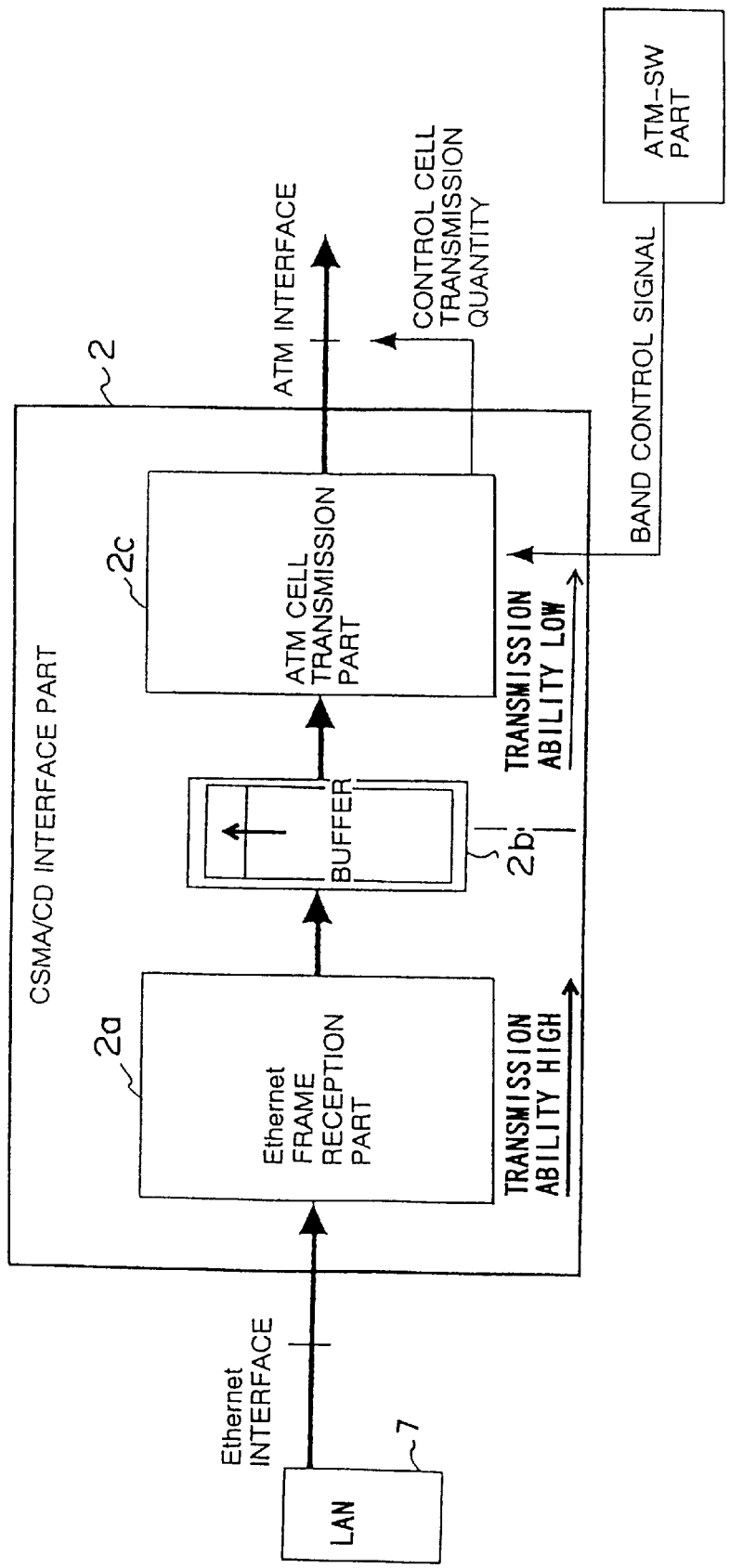
FIG. 22 is an explanatory view of the prior art.

Further, in this embodiment, the transmission quantity lowering request cell is transmitted when the overflow forecast is made in the CPU of the card, however, the processes shown in FIG. 4 may be structured as shown in FIG.18. That is, a threshold for forecasting the buffer overflows of the downward buffer and thee upward buffer 24 is set based on the number of VCCs (Step 02), the data storage quantity in the downward buffer 23 or the downward buffer 24*b* (Step 03), and the transmission quantity lowing request cell is transmitted when the data storage quantity exceeds the threshold (Step 04).

Figure 8:
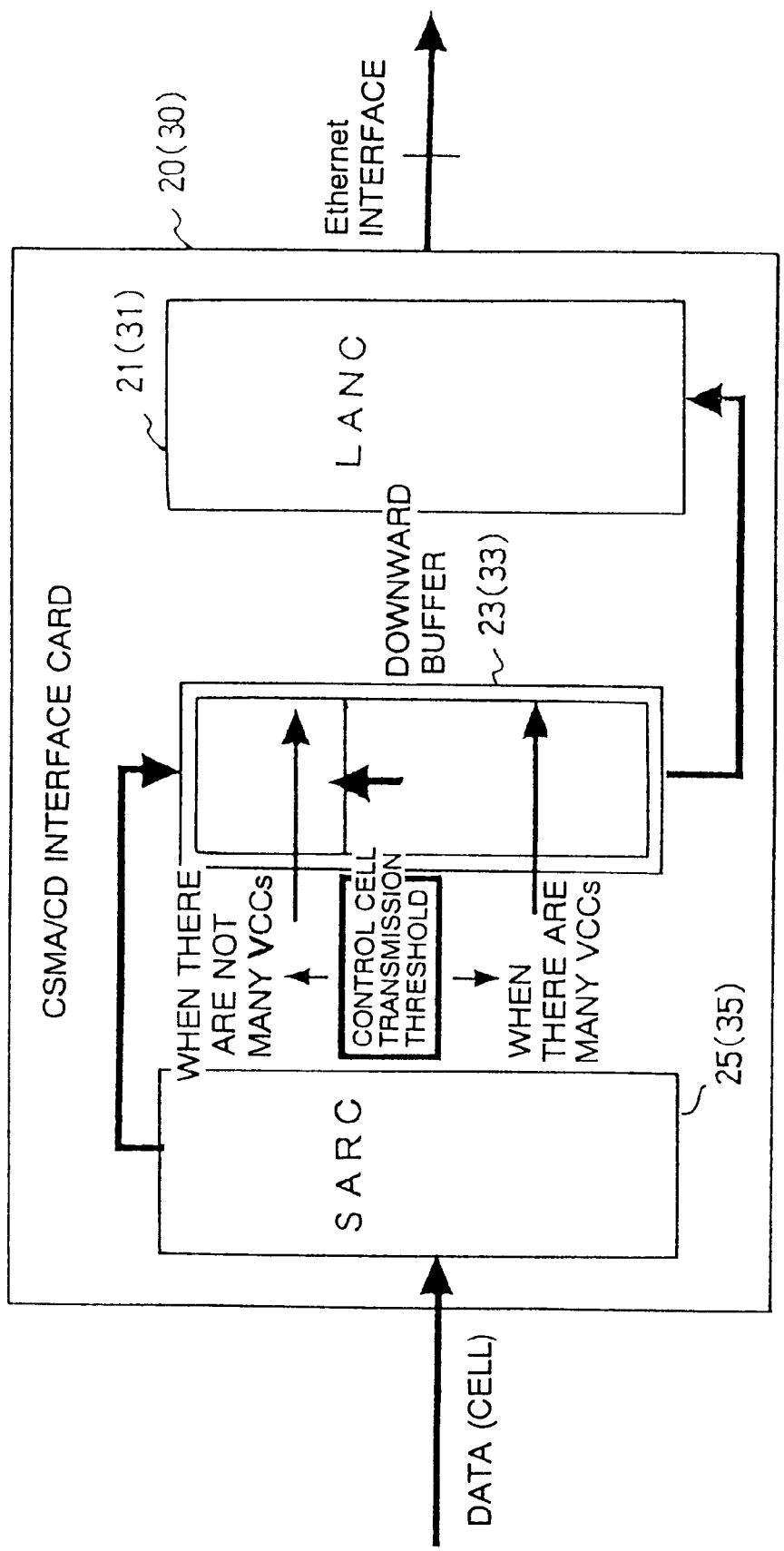
FIG. 8 is a principle explanatory view showing a modification of the embodiment.

For example, when the number of VCC is 1, there is little possibility that the SARC 25 receives a lots of cells in a short time, therefore, a threshold is set to a value slightly lower than all data volume of the downward buffer 23 (upward buffer 24). On the contrary, there is every possibility that the SARC 25 receives a lot of cells when the number of VCCs is large, therefore, the thresholds is set to a lower value as the number of VCCs is larger (refer to Principle shown in FIG. 8).

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. A network system comprising a first communication device connected to a first local area network and an Asynchronous Transfer Mode network and a second communication device connected to a second local area network and the Asynchronous Taransfer Mode:

said first communication device comprising:
buffer means for holding data received from the Asynchronous Transfer Mode network;
first transmission means for transmitting the data held by the buffer means to the first local area network;
monitor means for monitoring a storage quantity of the data held by the buffer means; and
control data generation means for generating and transmitting control data when the monitor means indicates a possibility of a overflow of the data in the buffer means;

said second communication device comprising:
second transmission means for transmitting data received from the second local area network to the first communication device; and
control means for obtaining the control data transmitted from the control data generation means and for reducing a quantity of the data transmitted from the second transmission means based on the control data, wherein said control data generation means generates a control cell by storing the control data and a payload identifier showing that the cell is the control cell in a payload of a cell generated in AAL Type 5 format.

2. A network system comprising a first communication device connected to a first local area network an Asynchronous Transfer Mode network and a second communication device connected to a second local area network and the Asynchronous Transfer Mode network:

said first communication device comprising:
buffer means for holding data received from the Asynchronous Transfer Mode network;
first transmission means for transmitting the data held by the buffer means to the first local area network;
monitor means for monitoring a storage quantity of the data held by the buffer means; and
control data generation means for generating and transmitting control data when the monitor means indicates a possibility of a overflow of the data in the buffer means;

said second communication device comprising:
second transmission means for transmitting data received from the second local area network to the first communication device; and control means for obtaining the control data transmitted from the control data generation means and for reducing a quantity of the data transmitted from the second transmission means based on the control data, wherein said control means makes said transmission means stop data transmission to the first communication device based on the control data.

3. A network system according to claim 2, wherein when said monitor means releases the possibility of the overflow of the data, said control data generation means generates and transmits control release data to the second communication device, and said control means makes the transmission means start again data transmission of the first communication device based on the control release data.

4. A network system comprising a first communication device connected to a first local area network an Asynchronous Transfer Mode network and a second communication device connected to a second local area network and the Asynchronous Transfer Mode network:

said first communication device comprising:
buffer means for holding data received from the Asynchronous Transfer Mode network;
first transmission means for transmitting the data held by the buffer means to the first local area network;
monitor means for monitoring a storage quantity of the data held by the buffer means; and control data generating means for generating and transmitting control data in the buffer means;

said second communication device comprising:
second transmission means for transmitting data received from the second local area network to the first communication device; and
control means for obtaining the control data transmitted from the control data generation means and for reducing a quantity of the data transmitted from the second transmission means based on the control data, wherein said control means stops data reception from the second local area network based on the control data.

5. A network system according to claim 4, wherein the second local area network executes a carrier sense multiple access/collision detection control, said control means stops data reception from the second local area network by transmitting a jam signal to the second local area network.

6. A network system according to claim 4, wherein the second local area network executes a carrier sense multiple access/collision detection control, said control means stops data reception from the second local area network by transmitting a carrier signal to the second local area network.

7. A network system according to claim 4, wherein when said monitor means releases the possibility of the overflow of the data, said control data generation means generates and transmits control release data to the second communication device, and said control means starts again data reception from the second local area network based on the control release data.

8. A network system comprising a first communication device connected to a first local area network an Asynchronous Transfer Mode network and a second communication device connected to a second local area network and the Asynchronous Transfer Mode network;

said first communication device comprising:
buffer means for holding data received from the Asynchronous Transfer Mode network;
first transmission means for transmitting the data held by the buffer means to the first local area network;
monitor means for monitoring a storage quantity of the data held by the buffer means; and
control data generating means for generating and transmitting control data in the buffer means;

said second communication device comprising:
second transmission means for transmitting data received from the second local area network to the first communication device;
control means for obtaining the control data transmitted from the control data generation means and for reducing a quantity of the data transmitted from the second transmission means based on the control data; and
second buffer means for holding data received from the second local area network and transmitted by said second transmission means, and judgment means for judging whether the data overflow from the second buffer or not; and
wherein said control means stops data reception from the second local area network when the judgment means judges that the data overflow from the second buffer.

9. A network system according to claim 8, wherein the second local area network executes a carrier sense multiple access/collision detection control, said control means stops data reception from the second local area network by transmitting a jam signal to the second local area network.

10. A network system according to claim 8, wherein the second local area network executes a carrier sense multiple access/collision detection control, said control means stops data reception from the second local area network by transmitting a carrier signal to the second local area network.

11. A network system comprising a first communication device connected to a first local area network and an Asynchronous Transfer Mode network and a second communication device connected to a second local area network and the Asynchronous Taransfer Mode:

said first communication device comprising:
buffer means for holding data received from the Asynchronous Transfer Mode network;
first transmission means for transmitting the data held by the buffer means to the first local area network;
monitor means for monitoring a storage quantity of the data held by the buffer means; and
control data generation means for generating and transmitting control data when the monitor means indicates a possibility of a overflow of the data in the buffer means;

said second communication device comprising:
second transmission means for transmitting data received from the second local area network to the first communication device; and
control means for obtaining the control data transmitted from the control data generation means and for reducing a quantity of the data transmitted from the second transmission means based on the control data, wherein said control data generation means generates control data and said control means obtains the control data and stops data transmission from the second local area network when said monitor means judges that data overflow from the buffer means.

12. A network system according to claim 11, wherein the second local area network executes a carrier sense multiple access/collision detection control, said control means stops data reception from the second local area network by transmitting a jam signal to the second local area network.

13. A network system according to claim 11, wherein the second local area network executes a carrier sense multiple access/collision detection control, said control means stops data reception from the second local area network by transmitting a carrier signal to the second local area network.

14. A network system comprising a first communication device connected to a first local area network and an Asynchronous Transfer Mode network and a second communication device connected to a second local area network and the Asynchronous Taransfer Mode:
said first communication device comprising:
buffer means for holding data received from the Asynchronous Transfer Mode network;
first transmission means for transmitting the data held by the buffer means to the first local area network;
monitor means for monitoring a storage quantity of the data held by the buffer means; and
control data generation means for generating and transmitting control data
when the monitor means indicates a possibility of a overflow of the data in the buffer means;
said second communication device comprising:
second transmission means for transmitting data received from the second local area network to the first communication device; and
control means for obtaining the control data transmitted from the control data generation means and for reducing a quantity of the data transmitted from the second transmission means based on the control data;
wherein data is earlier discarded as the data is latter received by the first communication device when data overflows from the buffer means.

15. A communication device connected to a first communication device through an Asynchronous Transfer Mode connection said first communication device comprising:
buffer means for holding data received from the Asynchronous Transfer Mode network;
first transmission the data held by the buffer means to a first local area network;
monitor means for monitoring a storage quantity of the data held by the buffer means; and
control data generation means for generating and transmitting control data when the monitor means indicates a possibility of a overflow of the data in the buffer means;
said communication deceive comprising:
transmission means for transmitting data received from a second local area network to the first communication device; and
control means for obtaining the control data transmitted from the control data generation means and for reducing a quantity of the data transmitted from the transmission means to the other communication device based on the control data;
wherein said control means makes said transmission means stop data transmission to said first communication device based on the control data.

16. A communication device connected to a first communication device through an Asynchronous Transfer Mode connection said first communication device comprising:
buffer means for holding data received from the Asynchronous Transfer Mode network;
first transmission the data held by the buffer means to a first local area network;
monitor means for monitoring a storage quantity of the data held by the buffer means; and
control data generation means for generating and transmitting control data when the monitor means indicates a possibility of a overflow of the data in the buffer means;
said communication device comprising:
transmission means for transmitting data received from a second local area network to the first communication device; and
control means for obtaining the control data transmitted from the control data generation means and for reducing a quantity of the data transmitted from the transmission means to the other communication device based on the control data;
wherein said control means stops data reception from the second local area network based on the control data.

17. A communication device connected to a first communication device through an Asynchronous Transfer Mode connection said first communication device comprising:
buffer means for holding data received from the Asynchronous Transfer Mode network;
first transmission the data held by the buffer means to a first local area network;
monitor means for monitoring a storage quantity of the data held by the buffer means; and
control data generation means for generating and transmitting control data when the monitor means indicates a possibility of a overflow of the data in the buffer means;
said communication device comprising:
transmutation means for transmitting data received from a second local area network to the first communication device; and
control means for obtaining the control data transmitted from the control data generation means and for reducing a quantity of the data transmitted from the transmission means to the other communication device based on the control data;
wherein said transmission means stops data transmission to the other communication device when the control means stops data reception from the second local area network.

18. A communication device connected to a first communication device through an Asynchronous Transfer Mode connection said first communication device comprising:
buffer means for holding data received from the Asynchronous Transfer Mode network;
first transmission the data held by the buffer means to a first local area network;
monitor means for monitoring a storage quantity of the data held by the buffer means; and
control data generation means for generating and transmitting control data when the monitor means indicates a possibility of a overflow of the data in the buffer means; said communication device comprising:
transmission means for transmitting data received from a second local area network to the first communication device;
control means for obtaining the control data transmitted from the control data generation means and for reducing a quantity of the data transmitted from the transmission means to the other communication device based on the control data;

second buffer means for holding data received from the second local area network and transmitted by said transmission means; and judgment means for judging whether data overflow from said second buffer means or not;

wherein said control means stops data reception from the second local area network when said judgment means judges that data overflows from said second buffer means.

19. A communication device connected to a first communication device through an Asynchronous Transfer Mode connection, said first communication device comprising:

first transmission means for transmitting data received from a first local area network; and control means for reducing a quantity of the data transmitted from the first transmission means based on control data;

said communication device comprising:

buffer means for holding the data received through the Asynchronous Transfer Mode connection;

transmission means for transmitting the data held by the buffer means to a second local area network;

monitor means for monitoring a storage quantity of the data held by the buffer means; and control data generation means for generating and transmitting the control data to the other communication device when said monitor means indicates a possibility of the overflow of the data in the buffer means, wherein data is earlier discarded as the data is latter received when data overflows from the buffer means.

* * * * *